(12) United States Patent
Tang

(10) Patent No.: US 12,222,583 B2
(45) Date of Patent: Feb. 11, 2025

(54) CAMERA OPTICAL LENS

(71) Applicant: AAC Optics (Suzhou) Co., Ltd., Suzhou (CN)

(72) Inventor: Han Tang, Shenzhen (CN)

(73) Assignee: AAC Optics (Suzhou) Co., Ltd., Suzhou (CN)

(*) Notice: Subject to any disclaimer, the term of this patent is extended or adjusted under 35 U.S.C. 154(b) by 631 days.

(21) Appl. No.: 17/560,288

(22) Filed: Dec. 23, 2021

(65) Prior Publication Data

US 2022/0326483 A1 Oct. 13, 2022

(30) Foreign Application Priority Data

Apr. 2, 2021 (CN) .......................... 202110362220.9

(51) Int. Cl.
| | | |
|---|---|---|
| G02B 9/64 | (2006.01) | |
| G02B 13/00 | (2006.01) | |
| G02B 13/04 | (2006.01) | |
| G02B 13/06 | (2006.01) | |
| G02B 3/04 | (2006.01) | |

(52) U.S. Cl.
CPC ........... *G02B 9/64* (2013.01); *G02B 13/0045* (2013.01); *G02B 13/04* (2013.01); *G02B 13/06* (2013.01); *G02B 3/04* (2013.01)

(58) Field of Classification Search
CPC ............ G02B 13/0045; G02B 13/0015; G02B 13/002; G02B 13/001; G02B 13/04; G02B 13/06; G02B 9/64; G02B 3/04

USPC .................. 359/708, 755, 750, 751
See application file for complete search history.

(56) References Cited

U.S. PATENT DOCUMENTS

| | | | | |
|---|---|---|---|---|
| 9,989,738 | B2* | 6/2018 | Lai ........................ | G02B 5/005 |
| 10,502,933 | B2* | 12/2019 | Chang ................ | G02B 13/0045 |
| 10,578,836 | B2* | 3/2020 | Sato ........................ | G02B 9/64 |
| 10,698,185 | B2* | 6/2020 | Chang ................ | G02B 13/0045 |
| 10,976,523 | B2* | 4/2021 | Song .................. | G02B 13/0045 |
| 12,072,474 | B2* | 8/2024 | Zhang ...................... | G02B 9/64 |

\* cited by examiner

*Primary Examiner* — Wyatt A Stoffa
*Assistant Examiner* — Alex Park Rickel
(74) *Attorney, Agent, or Firm* — W&G Law Group

(57) ABSTRACT

The present disclosure relates to a technical field of optical lenses, and discloses a camera optical lens. The camera optical lens includes seven lenses. An order of the seven lenses is sequentially from an object side to an image side, which is shown as follows: a first lens having a negative refractive power, a second lens having a positive refractive power, a third lens having a positive refractive power, a fourth lens having a negative refractive power, a fifth lens having a refractive power, a sixth lens having a positive refractive power, and a seventh lens having a negative refractive power. While the camera optical lens has good optical performance, the camera optical lens further meets design requirements of large aperture, wide-angle, and ultra-thinness.

19 Claims, 15 Drawing Sheets

CAMERA OPTICAL LENS

TECHNICAL FIELD

The present disclosure relates to the field of optical lens, and in particular to a camera optical lens suitable for handheld devices, such as smart phones, digital cameras, and imaging devices, such as monitors or PC lenses.

BACKGROUND

With emergence of smart phones in recent years, demand for miniature camera lens is increasing day by day, and because a pixel size of per photosensitive device shrinks, in addition a development trend of electronic products with good functions, and thin and portable appears, therefore, a miniaturized camera optical lens having good imaging quality becomes a mainstream in current market. In order to obtain better imaging quality, multi-piece lens structure is mainly adopted. Moreover, with development of technology and increases of diversified needs of users, a pixel area of per photosensitive device is constantly shrinking, and requirements of optical systems for imaging quality are constantly increasing. A seven-piece lens structure gradually appears in lens design. There is an urgent need for a wide-angled camera optical lens having excellent optical characteristics, a small size, and fully corrected aberrations.

SUMMARY

Aiming at above problems, the present disclosure seeks to provide a camera optical lens, which has good optical performance and meets design requirements of large aperture, ultra-thinness, and wide-angle.

In order to solve the above problems, embodiments of the present disclosure provide a camera optical lens. The camera optical lens includes seven lenses. An order of the seven lenses is sequentially from an object side to an image side, which is shown as follows: a first lens having a negative refractive power, a second lens having a positive refractive power, a third lens having a positive refractive power, a fourth lens having a negative refractive power, a fifth lens having a refractive power, a sixth lens having a positive refractive power, and a seventh lens having a negative refractive power. A field of view of the camera optical lens in a diagonal direction is denoted as FOV, a refractive index of the second lens is denoted as n2, an abbe number of the third lens is denoted as v3, an abbe number of the fourth lens is denoted as v4, a center curvature radius of an object side surface of the sixth lens is denoted as R11, a center curvature radius of an image side surface of the sixth lens is denoted as R12, and the camera optical lens satisfies following relationships:

$155.00° \leq FOV$;

$1.70 \leq n2 \leq 220$;

$2.80 \leq v3/v4 \leq 4.20$;

$-5.00 \leq R11/R12 \leq -1.20$.

As an improvement, an on-axis thickness of the sixth lens is denoted as d11, an on-axis thickness of the seventh lens is denoted as d13, and the camera optical lens satisfies a following relationship:

$1.50 \leq d11/d13 \leq 4.00$.

As an improvement, an object side surface of the first lens is convex in a paraxial region, an image side surface of the first lens is concave in a paraxial region. A focal length of the camera optical lens is denoted as f, a focal length of the first lens is denoted as f1, a center curvature radius of the object side surface of the first lens is denoted as R1, a center curvature radius of the image side surface of the first lens is denoted as R2, an on-axis thickness of the first lens is denoted as d1, a total optical length of the camera optical lens is denoted as TTL, and the camera optical lens satisfies following relationships:

$-4.47 \leq f1/f \leq -1.15$;

$0.72 \leq (R1+R2)/(R1-R2) \leq 2.54$;

$0.02 \leq d1/TTL \leq 0.10$.

As an improvement, the camera optical lens satisfies following relationships:

$-2.79 \leq f1/f \leq -1.43$;

$1.15 \leq (R1+R2)/(R1-R2) \leq 2.03$;

$0.02 \leq d1/TTL \leq 0.08$.

As an improvement, an object side surface of the second lens is concave in a paraxial region, an image side surface of the second lens is convex in a paraxial region. A focal length of the camera optical lens is denoted as f, a focal length of the second lens is denoted as f2, a center curvature radius of the object side surface of the second lens is denoted as R3, a center curvature radius of the image side surface of the second lens is denoted as R4, an on-axis thickness of the second lens is denoted as d3, a total optical length of the camera optical lens is denoted as TTL, and the camera optical lens satisfies following relationships:

$1.23 \leq f2/f \leq 6.05$;

$1.18 \leq (R3+R4)/(R3-R4) \leq 11.86$;

$0.07 \leq d3/TTL \leq 0.22$.

As an improvement, the camera optical lens satisfies following relationships:

$1.96 \leq f2/f \leq 4.84$;

$1.89 \leq (R3+R4)/(R3-R4) \leq 9.49$;

$0.10 \leq d3/TTL \leq 0.18$.

As an improvement, an object side surface of the third lens is convex in a paraxial region an image side surface of the third lens is convex in a paraxial region. A focal length of the camera optical lens is denoted as f, a focal length of the third lens is denoted as f3, a center curvature radius of the object side surface of the third lens is denoted as R5, a center curvature radius of the image side surface of the third lens is denoted as R6, an on-axis thickness of the third lens is denoted as d5, a total optical length of the camera optical lens is denoted as TTL, and the camera optical lens satisfies following relationships:

$0.62 \leq f3/f \leq 2.00$;

$-0.39 \leq (R5+R6)/(R5-R6) \leq 0.12$;

$0.02 \leq d5/TTL \leq 0.20$.

As an improvement, the camera optical lens satisfies following relationships:

$$0.99 \leq f3/f \leq 1.60;$$

$$-0.25 \leq (R5+R6)/(R5-R6) \leq 0.10;$$

$$0.04 \leq d5/TTL \leq 0.16.$$

As an improvement, a focal length of the camera optical lens is denoted as f, a focal length of the fourth lens is denoted as f4, a center curvature radius of an object side surface of the fourth lens is denoted as R7, a center curvature radius of an image side surface of the fourth lens is denoted as R8, an on-axis thickness of the fourth lens is denoted as d7, a total optical length of the camera optical lens is denoted as TTL, and the camera optical lens satisfies following relationships:

$$-7.30 \leq f4/f \leq -1.15;$$

$$-2.13 \leq (R7+R8)/(R7-R8) \leq 4.89;$$

$$0.01 \leq d7/TTL \leq 0.05,$$

As an improvement, the camera optical lens satisfies following relationships:

$$-4.56 \leq f4/f \leq -1.44;$$

$$-1.33 \leq (R7+R8)/(R7-R8) \leq 3.91;$$

$$0.02 \leq d7/TTL \leq 0.04.$$

As an improvement, an object side surface of the fifth lens is concave in a paraxial region. A focal length of the camera optical lens is denoted as f, a focal length of the fifth lens is denoted as f5, a center curvature radius of the object side surface of the fifth lens is denoted as R9, a center curvature radius of an image side Surface of the fifth lens is denoted as R10, an on-axis thickness of the fifth lens is denoted as d9, a total optical length of the camera optical lens is denoted as TTL, and the camera optical lens satisfies following relationships:

$$-24.51 \leq f5/f \leq 20.96;$$

$$-7.05 \leq (R9+R10)/(R9-R10) \leq 14.14;$$

$$0.01 \leq d9/TTL \leq 0.05.$$

As an improvement, the camera optical lens satisfies following relationships:

$$-15.32 \leq f5/f \leq 16.77;$$

$$-4.41 \leq (R9+R10)/(R9-R10) \leq 11.31;$$

$$0.02 \leq TTL \leq 0.04.$$

As an improvement, the object side surface of the sixth lens is convex in a paraxial region, the image side surface of the sixth lens is convex in a paraxial region. A focal length of the camera optical lens is denoted as f, a focal length of the sixth lens is denoted as f6, an on-axis thickness of the sixth lens is denoted as d11, a total optical length of the camera optical lens is denoted as TTL, and the camera optical lens satisfies following relationships:

$$1.21 \leq f6/f \leq 4.63;$$

$$0.03 \leq d11/TTL \leq 0.22.$$

As an improvement, the camera optical lens satisfies following relationships:

$$1.94 \leq f6/f \leq 3.71;$$

$$0.06 \leq d11/TTL \leq 0.18.$$

As an improvement, an image side surface of the seventh lens is concave in a paraxial region. A focal length of the camera optical lens is denoted as f, a focal length of the seventh lens is denoted as f7, a center curvature radius of the object side surface of the seventh lens is denoted as R13, a center curvature radius of an image side surface of the seventh lens is denoted as R14, an on-axis thickness of the seventh lens is denoted as d13, a total optical length of the camera optical lens is denoted as TTL, and the camera optical lens satisfies following relationships:

$$-5.26 \leq f7/f \leq -1.37;$$

$$-0.03 \leq (R13+R14)/(R13-R14) \leq 2.57;$$

$$0.02 \leq d13/TTL \leq 0.07.$$

As an improvement, the camera optical lens satisfies following relationships:

$$-3.28 \leq f7/f \leq -1.71;$$

$$-0.02 \leq (R13+R14)/(R13-R14) \leq 2.06;$$

$$0.03 \leq d13/TTL \leq 0.06.$$

As an improvement, the first lens is made of a glass material, the second lens is made of a glass material, and the third lens is made of a glass material.

As an improvement, an F number of the camera optical lens is denoted as FNO, and the camera optical lens satisfies a following relationship:

$$FNO \leq 2.88.$$

As an improvement, a focal length of the camera optical lens is denoted as f, a combined focal length of the first lens and the second lens is denoted as f12, and the camera optical lens satisfies a following relationship:

$$-5279.08 \leq f12/f \leq 54.02.$$

As an improvement, an image height of the camera optical lens is denoted as IH, a total optical length of the camera optical lens is denoted as TTL, and the camera optical lens satisfies a following relationship:

$$TTL/IH \leq 3.25$$

The beneficial effects of the present disclosure are as follows. The camera optical lens provided by the present disclosure has excellent optical characteristics, and further has characteristics of large aperture, wide-angle, and ultra-thin, especially suitable for mobile phone camera lens assemblies and WEB camera lenses, which are composed of camera components having high pixels, such as CCD and CMOS.

BRIEF DESCRIPTION OF DRAWINGS

To more clearly illustrate the technical solutions in the embodiments of the present disclosure clearer, accompanying drawings that need to be used in the description of the embodiments will briefly introduce in following. Obviously, the drawings described below are only some embodiments of the present disclosure. For A person of ordinary skill in the art, other drawings can be obtained according to these without creative labor, wherein.

DETAILED DESCRIPTION OF EMBODIMENTS

In order to make objects, technical solutions, and advantages of the present disclosure clearer, embodiments of the present disclosure are described in detail with reference to accompanying drawings in following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
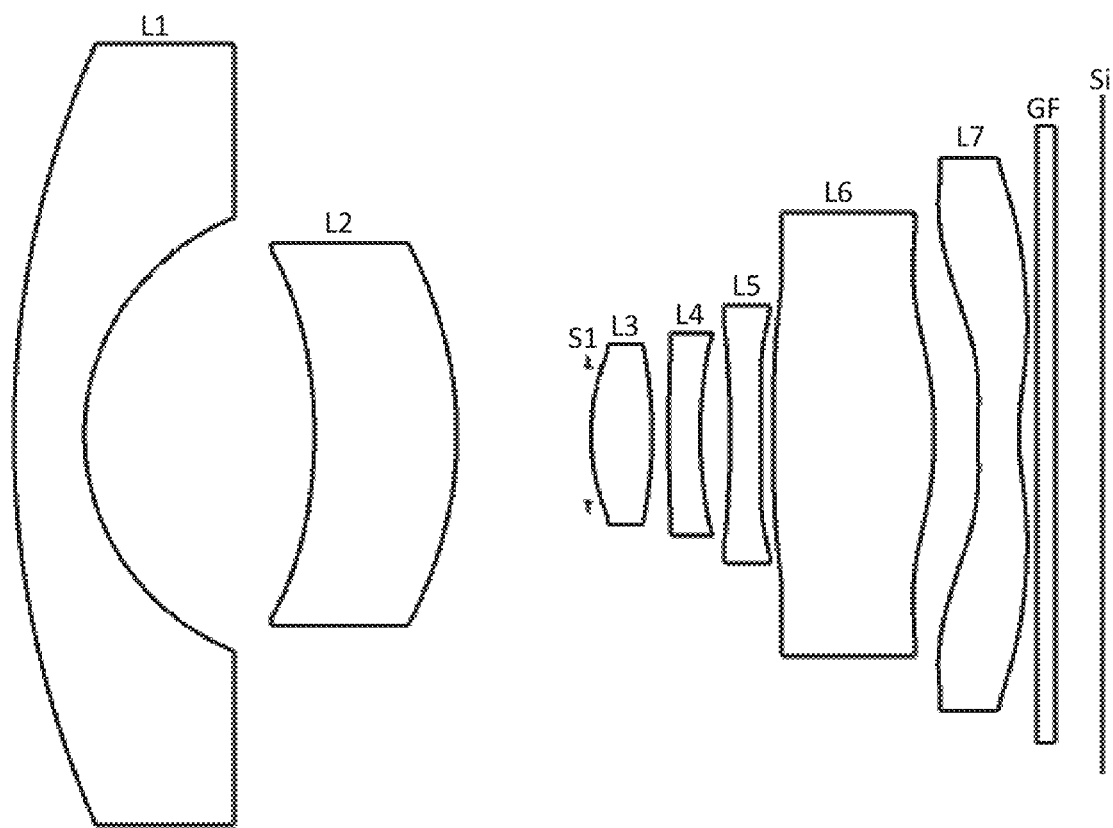
FIG. 1 is a schematic diagram of a structure of a camera optical lens according to a first embodiment of the present disclosure.

Referring to the drawings, the present disclosure provides a camera optical lens 10. FIG. 1 shows a structure of the camera optical lens 10 of a first embodiment of the present disclosure. The camera optical lens 10 includes seven lenses. Specifically, an order of the camera optical lens 10 is sequentially from an object side to an image side, which is shown as follows: a first lens L1, a second lens L2, an aperture S1, a third lens L3, a fourth lens L4, a fifth lens L5, a sixth lens L6, and a seventh lens L7. An optical element such as an optical filter GF may be disposed between the seventh lens L7 and an image surface Si.

In the embodiment, the first lens L1 is made of a glass material, the second lens L2 is made of a glass material, the third lens L3 is made of a glass material, the fourth lens L4 is made of a plastic material, the fifth lens L5 is made of a plastic material, the sixth lens 16 is made of a plastic material, and the seventh lens L7 is made of a plastic material. In other alternative embodiments, the lenses may be made of other materials.

In the embodiment, a field of view of the camera optical lens 10 in a diagonal direction is denoted as FOV, which satisfies a following relationship: 155.00°≤FOV, and further specifies a the field of view FOV of the camera optical lens in the diagonal direction. In a range of the conditional formula, it is beneficial to achieve an ultra-wide-angle effect.

A refractive index of the second lens L2 is denoted as n2, which satisfies a following relationship: 1.70≤n2≤2.20, and further specifies the refractive index n2 of the second lens L2. In a range of the conditional formula, it is beneficial to improve optical performance.

An abbe number of the third lens L3 is denoted as v3, an abbe number of the fourth lens L4 is denoted as v4, which satisfies a following relationship: 2.80≤v3/v4≤4.20, and further specifies a ratio of the abbe number v3 of the third lens L3 to the abbe number v4 of the fourth lens L4. In a range of the conditional formula, it is beneficial to improve the optical performance.

A center curvature radius of an object side surface of the sixth lens L6 is denoted as R11, a center curvature radius of an image side surface of the sixth lens L6 is denoted as R12, which satisfies a following relationship: −5.00≤R11/R12≤−1.20, and further specifies a shape of the sixth lens L6. In a range of the conditional formula, it may alleviate deflection degree of light passing through the lenses and effectively reduce aberrations.

An on-axis thickness of the sixth lens L6 is denoted as d11, an on-axis thickness of the seventh lens L7 is denoted as d13, which satisfies a following relationship: 1.50≤d11/d13≤4.00, and further specifies a ratio of the on-axis thickness d11 of the sixth lens L6 to the on-axis thickness d13 of the seventh lens L7. In a range of the conditional formula, it is beneficial to compress the total optical length and further achieve an ultra-thin effect.

In the embodiment, the first lens L1 has a negative refractive power, an object side surface of the first lens L1 is convex in a paraxial region, and the image side surface of the first lens L1 is concave in a paraxial region. In other alternative embodiments, both the object side surface and the image side surface of the first lens L1 may be replaced with other concave and convex distributions.

A focal length of the camera optical lens 10 is denoted as f, a focal length of the first lens L1 is denoted as f1, which satisfies a following relationship: −4.47≤f1/f≤−1.15, and further specifies a ratio of the focal length of the first lens L1 to the focal length of the camera optical lens 10. In a range of the conditional formula, the first lens L1 has a suitable negative refractive power, which is beneficial to reduce aberrations of an optical system and also beneficial for ultra-thinness and wide-angle development. As an improvement, a following relationship is satisfied: −2.79≤f1/f≤−1.43.

A center curvature radius of the object side surface of the first lens L1 is denoted as R1, a center curvature radius of the image side surface of the first lens L1 is denoted as R2, which satisfies a following relationship: $0.72 \leq (R1+R2)/R1-R2) \leq 2.54$. Thus, a shape of the first lens L1 is reasonably controlled to effectively correct spherical aberrations of the camera optical lens 10. As an improvement, a following relationship is satisfied: $1.15 \leq (R1+R2)/(R1-R2) \leq 2.03$.

A total optical length of the camera optical lens 10 is denoted as TTL, An on-axis thickness of the first lens L1 is denoted as d1, which satisfies a following relationship: $0.02 \leq d1/TTL \leq 0.10$. In a range of the conditional formula, it is beneficial to achieve ultra-thinness. As an improvement, a following relationship is satisfied: $0.02 \leq d1/TTL \leq 0.08$.

In the embodiment, the second lens L2 has a positive refractive power, an object side surface of the second lens L2 is concave in a paraxial region, and an image side surface of the second lens L2 is convex in a paraxial region. In other alternative embodiments, both the object side surface and the image side surface of the second lens L2 may be replaced with other concave and convex distributions.

The focal length of the camera optical lens 10 is denoted as f, a focal length of the second lens L2 is denoted as f2, which satisfies a following relationship: $1.23 \leq f2/f \leq 6.05$. A positive focal power of the second lens L2 is controlled in a reasonable range, which is beneficial to correct the aberrations of the optical system. As an improvement, a following relationship is satisfied: $1.96 \leq f2/f \leq 4.84$.

A center curvature radius of the object side surface of the second lens L2 is denoted as R3, a center curvature radius of the image side surface of the second lens L2 is R4, which satisfies a following relationship: $1.18 \leq (R3+R4)/(R3-R4) \leq 11.86$, and further specifies a shape of the second lens L2. In a range of the conditional formula, with the development of the camera optical lens 10 toward to ultra-thinness and wide-angle, it is beneficial to correct a problem of axial chromatic aberrations. As an improvement, a following relationship is satisfied: $1.89 \leq (R3+R4)/(R3-R4) \leq 9.49$.

The total optical length of the camera optical lens 10 is denoted as TTL, an on-axis thickness of the second lens L2 is denoted as d3, which satisfies a following relationship: $0.07 \leq d3/TTL \leq 0.22$. In a range of the conditional formula, it is beneficial to achieve ultra-thinness. As an improvement, a following relationship is satisfied: $0.10 \leq d3/TTL \leq 0.18$.

In the embodiment, the third lens L3 has a positive refractive power, an object side surface of the third lens L3 is convex in a paraxial region, and an image side surface of the third lens L3 is convex in a paraxial region. In other alternative embodiments, both the object side surface and the image side surface of the third lens L3 may be replaced with other concave and convex distributions.

The focal length of the camera optical lens 10 is denoted as f, a focal length of the third lens L3 is denoted as f3, which satisfies a following relationship: $0.62 \leq f3/f \leq 2.00$. Through a reasonable distribution of focal power, the optical system has better imaging quality and lower sensitivity. As an improvement, a following relationship is satisfied: $0.99 \leq f3/f \leq 1.60$.

A center curvature radius of the object side surface of the third lens L3 is denoted as R5, a center curvature radius of the image side surface of the third lens L3 is R6, which satisfies a following relationship: $-0.39 \leq (R5+R6)/(R5-R6) \leq 0.12$, and further specifies a shape of the third lens L3 and is beneficial to molding of the third lens L3. In a range of the conditional formula, it may alleviate deflection degree of light passing through the lenses and effectively reduce the aberrations. As an improvement, a following relationship is satisfied: $-0.25 \leq (R5+R6)/(R5-R6) \leq 0.10$.

The total optical length of the camera optical lens 10 is denoted as TTL, an on-axis thickness of the third lens L3 is denoted as d5, which satisfies a following relationship: $0.02 \leq d5/TTL \leq 0.20$. In a range of the conditional formula, it is beneficial to achieve ultra-thinness. As an improvement, a following relationship is satisfied: $0.04 \leq d5/TTL \leq 0.16$.

In the embodiment, the fourth lens L4 has a negative refractive power, an object side surface of the fourth lens L4 is convex in a paraxial region, and an image side surface of the fourth lens L4 is concave in a paraxial region. In other alternative embodiments, both the object side surface and the image side surface of the fourth lens L4 may be replaced with other concave and convex distributions.

The focal length of the camera optical lens 10 is denoted as f, a focal length of the fourth lens L4 is denoted as f4, which satisfies a following relationship: $-7.30 \leq f4/f \leq -1.15$. Through a reasonable distribution of the focal power, the optical system has better imaging quality and lower sensitivity. As an improvement, a following relationship is satisfied: $-4.56 \leq f4/f \leq -1.44$.

A center curvature radius of the object side surface of the fourth lens L4 is denoted as R7, a center curvature radius of the image side surface of the fourth lens L4 is denoted as R8, which satisfies a following relationship: $-2.13 \leq (R7+R8)/(R7-R8) \leq 4.89$, and further specifies a shape of the fourth lens L4. In a range of the conditional formula, with the ultra-thin and wide-angle development, it is beneficial to correct the aberrations of off-axis angle of view and other problems. As an improvement, a following relationship is satisfied: $-1.33 \leq (R7+R8)/(R7-R8) \leq 3.91$.

The total optical length of the camera optical lens 10 is denoted as TTL, an on-axis thickness of the fourth lens L4 is denoted as d7, which satisfies a following relationship: $0.01 \leq d7/TTL \leq 0.05$. In a range of the conditional formula, it is beneficial to achieve ultra-thinness. As an improvement, a following relationship is satisfied: $0.02 \leq d7/TTL \leq 0.04$.

In the embodiment, the fifth lens L5 has a negative refractive power, an object side surface of the fifth lens L5 is concave in a paraxial region, an image side surface of the fifth lens L5 is convex in a paraxial region. In other alternative embodiments, both the object side surface and the image side surface of the fifth lens L5 may be replaced with other concave and convex distributions.

The focal length of the camera optical lens 10 is denoted as f, the focal length of the fifth lens L5 is denoted as f5, which satisfies a following relationship: $-24.51 \leq f5/f \leq 20.96$. A limitation of the fifth lens L5 may effectively make a light angle of the camera optical lens 10 smooth and reduce tolerance sensitivity. As an improvement, a following relationship is satisfied: $-15.32 \leq f5/f \leq 16.77$.

A center curvature radius of the object side surface of the fifth lens L5 is denoted as R9, a center curvature radius of the image side surface of the fifth lens L5 is denoted as R10, which satisfies a following relationship: $-7.05 \leq (R9+R10)/(R9-R10) \leq 14.14$, and further specifies a shape of the fifth lens L5. In a range of the conditional formula, with the ultra-thin and wide-angle development, it is beneficial to correct the aberrations of off-axis angle of view and other problems. As an improvement, a following relationship is satisfied: $-4.41 \leq (R9+R10)/(R9-R10) \leq 11.31$.

The total optical length of the camera optical lens 10 is denoted as TTL, an on-axis thickness of the fifth lens L5 is denoted as d9, which satisfies a following relationship: $0.01 \leq d9/TTL \leq 0.05$. In a range of the conditional formula, it is beneficial to achieve ultra-thinness. As an improvement, a following relationship is satisfied: $0.02 \leq d9/TTL \leq 0.04$.

In the embodiment, the sixth lens L6 has a positive refractive power, the object side surface of the sixth lens L6 is convex in a paraxial region, and the image side surface of the sixth lens L6 is convex in a paraxial region. In other alternative embodiments, both the object side surface and the image side surface of the sixth lens L6 may be replaced with other concave and convex distributions.

The focal length of the camera optical lens 10 is denoted as f, the focal length of the sixth lens L6 is denoted as f6, which satisfies a following relationship: $1.21 \leq f6/f \leq 4.63$. Through a reasonable distribution of the focal power, the camera optical lens 10 has better imaging quality and lower sensitivity. As an improvement, a following relationship is satisfied: $1.94 \leq f6/f \leq 3.71$.

The total optical length of the camera optical lens 10 is denoted as TTL, the on-axis thickness of the sixth lens L6 is denoted as d11, which satisfies a following relationship: $0.03 \leq d11/TTL \leq 0.22$. In a range of the conditional formula, it is beneficial to achieve ultra-thinness. As an improvement, a following relationship is satisfied: $0.06 \leq d11/TTL \leq 0.18$.

In the embodiment, the seventh lens L7 has a negative refractive power, an object side surface of the seventh lens L7 is convex in a paraxial region, and an image side surface of the seventh lens L7 is concave in a paraxial region. In other alternative embodiments, both the object side surface and the image side surface of the seventh lens L7 may be replaced with other concave and convex distributions.

The focal length of the camera optical lens 10 is denoted as f, a focal length of the seventh lens L7 is denoted as f7, which satisfies a following relationship: $-5.26 \leq f7/f \leq -1.37$. Through a reasonable distribution of the focal power, the optical system has better imaging quality and lower sensitivity. As an improvement, a following relationship is satisfied: $-3.28 \leq f7/f \leq -1.71$.

A center curvature radius of the object side surface of the seventh lens L7 is denoted as R13, a center curvature radius of the image side surface of the seventh lens L7 is denoted as R14, which satisfies a following relationship: $-0.03 \leq (R13+R14)/(R13-R14) \leq 2.57$, and further specifies a shape of the seventh lens L7. In a range of the conditional formula, with the ultra-thin and the wide-angle development, it is beneficial to correct the aberrations of off-axis angle of view and other problems. As an improvement, a following relationship is satisfied: $-0.02 \leq (R13+R14)/(R13-R14) \leq 2.06$.

The on-axis thickness of the seventh lens 17 is denoted as d13, the total optical length of the camera optical lens 10 is denoted as TTL, which satisfies a following relationship: $0.025 \leq d13/TTL \leq 0.07$. In a range of the conditional formula, it is beneficial to achieve ultra-thinness. As an improvement, a following relationship is satisfied: $0.03 \leq d13/TTL \leq 0.06$.

In the embodiment, the focal length of the camera optical lens 10 is denoted as f, a combined focal length of the first lens L1 and the second lens L2 is denoted as f12, which satisfies a following relationship: $-5279.08 \leq f12/f \leq 54.02$. Thereby, the aberrations and distortion of the camera optical lens 10 may be eliminated, a back focal length of the camera optical lens 10 may be suppressed, and miniaturization of the camera lens system group may be maintained. As an improvement, a following relationship is satisfied: $-3299.43 \leq f12/f \leq 43.22$.

In the embodiment, an F number of the camera optical lens 10 is denoted as FNO, which satisfies a following relationship: $FNO \leq 2.88$, thereby achieving a large aperture. As an improvement, a following relationship is satisfied: $FNO \leq 2.83$.

In the embodiment, an image height of the camera optical lens 10 is denoted as IH, the total optical length of the camera optical lens 10 is denoted as TTL, which satisfies a following relationship: $TTL/IH \leq 3.25$, thereby being beneficial to achieve ultra-thinness. As an improvement, a following relationship is satisfied: $TTL/IH \leq 3.10$.

While satisfying above relationships, the camera optical lens 10 has excellent optical characteristics, and the camera optical lens 10 further meets design requirements of large aperture, wide-angle, and ultra-thinness. According to the characteristics of the camera optical lens 10, the camera optical lens 10 is especially suitable for mobile phone camera lens assemblies and WEB camera lenses, which are composed of camera components having high pixels, such as CCD and CMOS.

Following examples are used to illustrate the camera optical lens 10 of the present disclosure. Symbols described in each of the examples are as follows. Units of focal length, on-axis distance, central curvature radius, on-axis thickness, inflection point position, and arrest point position are millimeter (mm).

TTL denotes a total optical length (an on-axis distance from the object side surface of the first lens L1 to the image surface Si), a unit of which is mm.

FNO denotes an F number of the camera optical lens and refers to a ratio of an effective focal length of the camera optical lens 10 to an entrance pupil diameter of the camera optical lens 10.

As an improvement, inflection points and/or arrest points may be arranged on the object side surface and/or the image side surface of the lenses, thus meeting high-quality imaging requirements. For specific implementable schemes, refer to the following.

Table 1 and table 2 show design data of the camera optical lens 10 according to a first embodiment of the present disclosure.

TABLE 1

|  | R | d | nd |  | vd |  |
|---|---|---|---|---|---|---|
| S1 | ∞ | d0 = −6.527 |  |  |  |  |
| R1 | 11.864 | d1 = 0.800 | nd1 | 1.6779 | v1 | 55.52 |
| R2 | 2.770 | d2 = 2.612 |  |  |  |  |
| R3 | −5.749 | d3 = 1.620 | nd2 | 2.1800 | v2 | 33.00 |
| R4 | −4.458 | d4 = 1.525 |  |  |  |  |
| R5 | 2.865 | d5 = 0.693 | nd3 | 1.5357 | v3 | 85.82 |
| R6 | −4.113 | d6 = 0.184 |  |  |  |  |
| R7 | 19.457 | d7 = 0.360 | nd4 | 1.6610 | v4 | 20.53 |
| R8 | 4.556 | d8 = 0.347 |  |  |  |  |
| R9 | −8.735 | d9 = 0.350 | nd5 | 1.6610 | v5 | 20.53 |
| R10 | −15.653 | d10 = 0.133 |  |  |  |  |
| R11 | 24.191 | d11 = 1.830 | nd6 | 1.5444 | v6 | 55.82 |
| R12 | −4.887 | d12 = 0.500 |  |  |  |  |
| R13 | 10.745 | d13 = 0.460 | nd7 | 1.6610 | v7 | 20.53 |
| R14 | 2.825 | d14 = 0.200 |  |  |  |  |
| R15 | ∞ | d15 = 0.210 | ndg | 1.5168 | vg | 64.17 |
| R16 | ∞ | d16 = 0.544 |  |  |  |  |

Where meanings of various symbols are as follows.

S1: aperture;

R: a central curvature radius of an optical surface;

R1: a central curvature radius of the object side surface of the first lens L1;

R2: a central curvature radius of the image side surface of the first lens L1;

R3: a central curvature radius of the object side surface of the second lens L2;

R4: a central curvature radius of the image side surface of the second lens L2;

R5: a central curvature radius of the object side surface of the third lens L3;
R6: a central curvature radius of the image side surface of the third lens L3;
R7 a central curvature radius of the object side surface of the fourth lens L4;
R8: a central curvature radius of the image side surface of the fourth lens L4;
R9: a central curvature radius of the object side surface of the fifth lens L5;
R10: a central curvature radius of the image side surface of the fifth lens L5;
R11: a central curvature radius of the object side surface of the sixth lens L6;
R12: a central curvature radius of the image side surface of the sixth lens L6;
R13: a central curvature radius of the object side surface of the seventh lens L7;
R14: a central curvature radius of the image side surface of the seventh lens L7;
R15: a central curvature radius of the object side surface of the optical filter GF;
R16: a central curvature radius of the image side surface of the optical filter GF;
d: an on-axis thickness of a lens, an on-axis distance between lenses;
d0: an on-axis distance from the aperture S1 to the object side surface of the first lens L1;
d1: an on-axis thickness of the first lens L1;
d2: an on-axis distance from the image side surface of the first lens L1 to the object side surface of the second lens L2;
d3: an on-axis thickness of the second lens L2;
d4: an on-axis distance from the image side surface of the second lens L2 to the object side surface of the third lens L3;
d5: an on-axis thickness of the third lens L3;
d6: an on-axis distance from the image side surface of the third lens L3 to the object side surface of the fourth lens L4;
d7: an on-axis thickness of the fourth lens L4;
d8: an on-axis distance from the image side surface of the fourth lens L4 to the object side surface of the fifth lens L5;
d9: an on-axis thickness of the fifth lens L5;
d10: an on-axis distance from the image side surface of the fifth lens L5 to the object side surface of the sixth lens L6;
d11: an on-axis thickness of the sixth lens L6;
d12: an on-axis distance from the image side surface of the sixth lens L6 to the object side surface of the seventh lens L7;
d13: an on-axis thickness of the seventh lens L7;
d14: an on-axis distance from the image side surface of the seventh lens L7 to the object side surface of the optical filter GF;
d15: an on-axis thickness of the optical filter GF;
d16: on-axis distance from the image side surface of the optical filter GF to the image surface Si;
nd: refractive index of a d line (the d line is green light having a wavelength of 550 nm);
nd1: refractive index of a d line of the first lens L1;
nd2: refractive index of a d line of the second lens 12;
nd3: refractive index of a d line of the third lens L3;
nd4: refractive index of a d line of the fourth lens L4;
nd5: refractive index of a d line of the fifth lens L5;
nd6: refractive index of a d line of the sixth lens L6;
nd7: refractive index of a d line of the seventh lens L7;
ndg: refractive index of a d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
VG: abbe number of the optical filter GF.

Table 2 shows aspheric surface data of each of the lenses in the camera optical lens 10 according to the first embodiment of the present disclosure.

TABLE 2

| | Conic coefficient | Aspheric surface coefficients | | | | |
| --- | --- | --- | --- | --- | --- | --- |
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | −1.6081E+01 | −1.1705E−02 | 9.5212E−04 | 2.4760E−04 | −2.9925E−04 | 1.3727E−04 |
| R4 | −6.4926E+00 | −4.5585E−03 | −4.9969E−04 | 5.8470E−04 | −3.0448E−04 | 9.8379E−05 |
| R5 | 1.2641E+00 | 1.8272E−02 | −1.2094E−02 | 1.4832E−02 | −1.3823E−02 | 8.5351E−04 |
| R6 | 2.0211E+00 | 7.8013E−02 | −9.3693E−02 | 8.6760E−02 | −3.9478E−02 | −5.5784E−03 |
| R7 | 9.0000E+01 | 2.7065E−02 | −9.0892E−02 | 7.2353E−02 | 1.3981E−02 | −4.6181E−02 |
| R8 | −3.0351E+00 | −2.0722E−02 | −2.8754E−02 | 4.2497E−02 | −6.0865E−03 | −2.3848E−03 |
| R9 | 4.2579E+01 | 1.3497E−02 | 1.1888E−02 | 2.7003E−02 | −5.6155E−02 | 4.3959E−02 |
| R10 | 6.6879E+01 | 1.3469E−02 | 5.0809E−02 | 3.0233E−03 | −4.7820E−02 | 3.7884E−02 |
| R11 | 4.3916E+01 | −2.8462E−02 | 5.6888E−02 | −4.1005E−02 | 1.5551E−02 | −3.3414E−03 |
| R12 | −4.5591E+00 | −3.2137E−02 | 2.6309E−02 | −7.0168E−03 | 1.0626E−03 | −1.1148E−04 |
| R13 | 8.9434E+00 | −1.6272E−01 | 8.0853E−02 | −2.3476E−02 | 4.4676E−03 | −5.6673E−04 |
| R14 | −1.7497E+01 | −6.2812E−02 | 2.4942E−02 | −6.1841E−03 | 1.0154E−03 | −1.1235E−04 |

| | Conic coefficient | Aspheric surface coefficients | | | |
| --- | --- | --- | --- | --- | --- |
| | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | −1.6081E+01 | −3.8703E−05 | 6.6758E−06 | −6.3489E−07 | 2.5409E−08 |
| R4 | −6.4926E+00 | −2.0629E−05 | 2.7439E−06 | −2.0971E−07 | 6.9884E−09 |
| R5 | 1.2641E+00 | 1.5605E−03 | −2.7332E−04 | 0.0000E+00 | 0.0000E+00 |

TABLE 2-continued

| | | | | | |
|---|---|---|---|---|---|
| R6 | 2.0211E+00 | 6.9812E-03 | -1.1229E-03 | 0.0000E+00 | 0.0000E+00 |
| R7 | 9.0000E+01 | 2.0215E-02 | -9.2281E-04 | -1.2753E-03 | 2.2739E-04 |
| R8 | -3.0351E+00 | 2.5760E-04 | 6.7348E-05 | 1.9419E-05 | -5.4964E-06 |
| R9 | 4.2579E+00 | -1.8683E-02 | 4.5067E-03 | -5.8182E-04 | 3.1318E-05 |
| R10 | 6.6879E+01 | -1.4794E-02 | 3.2398E-03 | -3.7913E-04 | 1.8404E-05 |
| R11 | 4.3916E+01 | 4.0352E-04 | -2.5520E-05 | 6.4540E-07 | 1.2849E-09 |
| R12 | -4.5591E+00 | 9.2168E-06 | -5.8171E-07 | 2.2150E-08 | -3.4693E-10 |
| R13 | 8.9434E+00 | 4.7214E-05 | -2.4632E-06 | 7.2171E-08 | -8.9321E-10 |
| R14 | -1.7497E+01 | 8.1603E-06 | -3.6520E-07 | 9.0007E-09 | -9.2811E-11 |

For convenience, an aspheric surface of each lens surface uses an aspheric surface shown in a formula (1) below. However, the present disclosure is not limited to the a spherical polynomials form shown in the formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Herein, k denotes a conic coefficient, A4, A6, A8, A10, A12, A14, A16, A18, and A20 denote aspheric surface coefficients, c denotes a curvature of a center region of the optical surface, r denotes a, vertical distance from points on an aspheric surface curve to an optical axis, z denotes a depth of the aspheric surface (a point on the aspheric surf-ace and a distance of which from the optical axis is r; a vertical distance between the point and a tangent to a vertex on the optical axis of the a spherical surface).

Table 3 and Table 4 show design data of inflexion points and arrest points of each of the lenses of the camera optical lens 10 according to the first embodiment of the present disclosure. P1R1 and P1R2 respectively denote the object side surface and the image side surface of the first lens L1, P2R1 and P2R2 respectively denote the object side surface and the image side surface of the second lens L2, P3R1 and P3R2 respectively denote the object side surface and the image side surface of the third lens L3, P4R1 and P4R2 respectively denote the object side surface and the image side surface of the fourth lens L4, P5R1 and P5R2 respectively denote the object side surface and the image side surface of the fifth lens L5, P6R1 and P6R2 respectively denote the object side surface and the image side surface of the sixth lens L6, and P7R1 and P7R2 respectively denote the object side surface and the image side surface of the seventh lens L7. The data in the column named "inflexion point position" refer to vertical distances from inflexion points arranged on each lens surface to an optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 0 | / | / | / |
| P3R2 | 0 | / | / | / |
| P4R1 | 3 | 0.625 | 0.775 | 1.065 |
| P4R2 | 0 | / | / | / |
| P5R1 | 2 | 0.765 | 0.855 | / |
| P5R2 | 2 | 0.415 | 1.335 | / |
| P6R1 | 1 | 1.765 | / | / |
| P6R2 | 2 | 1.095 | 2.345 | / |
| P7R1 | 2 | 0.235 | 1.525 | / |
| P7R2 | 2 | 0.555 | 2.925 | / |

TABLE 4

| | Number(s) of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 1 | 0.645 | / |
| P6R1 | 0 | / | / |
| P6R2 | 2 | 1.945 | 2.655 |
| P7R1 | 2 | 0.405 | 2.715 |
| P7R2 | 1 | 1.285 | / |

Figure 2:
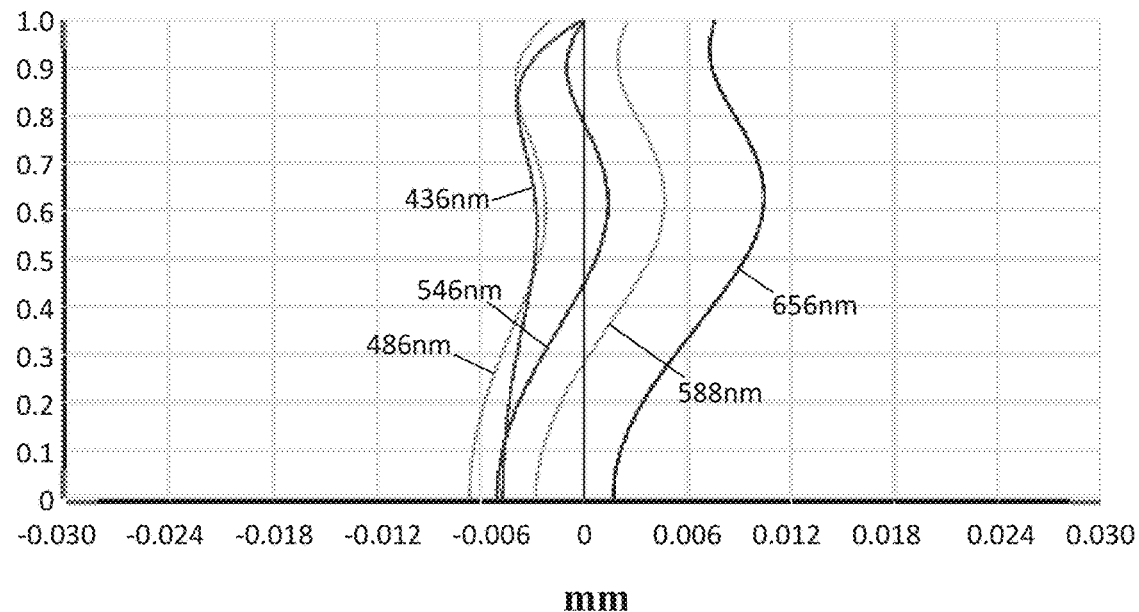
FIG. 2 is a schematic diagram of a longitudinal aberration of the camera optical lens shown in FIG. 1.
Figure 3:
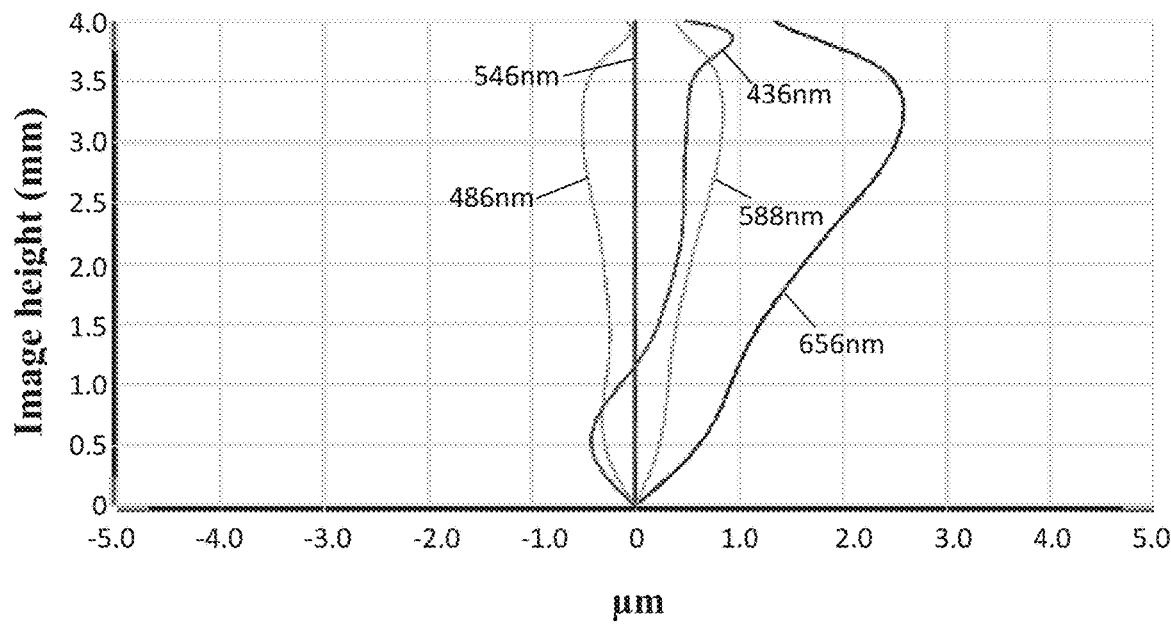
FIG. 3 is a schematic diagram of a lateral color of the camera optical lens shown in FIG. 1.
Figure 4:
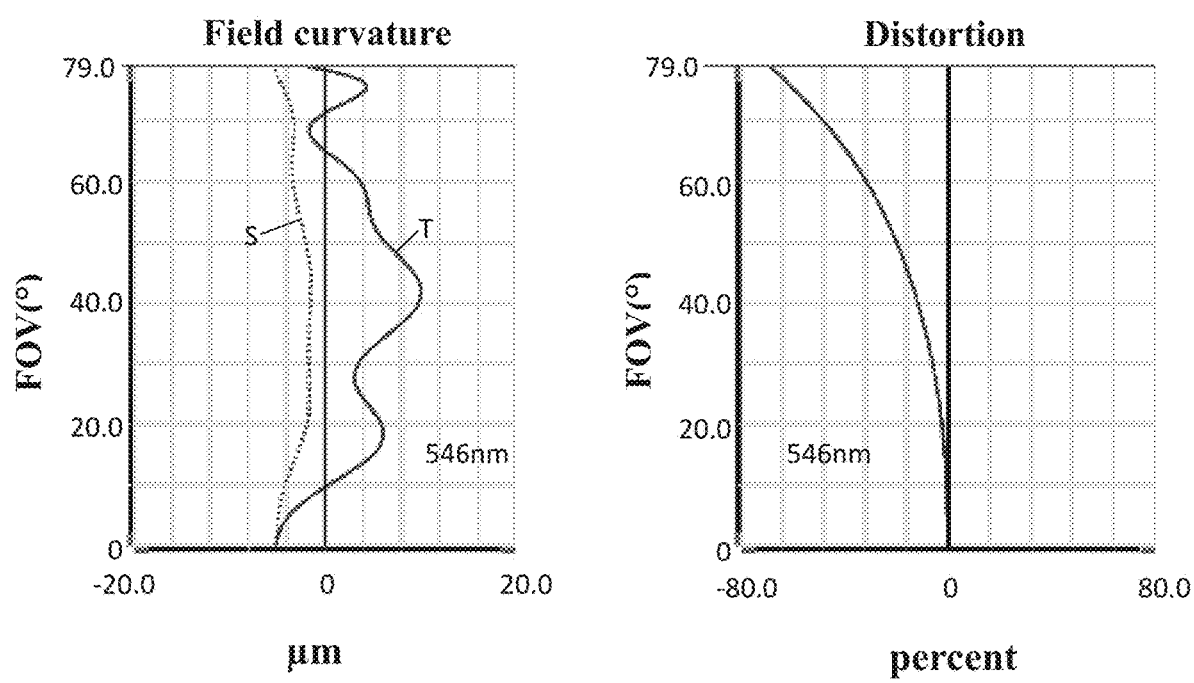
FIG. 4 is a schematic diagram of a field curvature and a distortion of the camera optical lens shown in FIG. 1.

FIG. 2 and FIG. 3 illustrate a longitudinal aberration and a lateral color of lights having wavelengths of 656 nm, 588 nm, 546 nm, 486 nm, and 436 nm after passing the camera optical lens 10 according to the first embodiment of the present disclosure, respectively. FIG. 4 illustrates a field curvature and a distortion of the light having the wavelength of 546 nm after passing the camera optical lens 10 according to the first embodiment of the present disclosure. A field curvature S in FIG. 4 is a field curvature in a sagittal direction, and T is a field curvature in a meridian direction.

The following table 21 further shows values corresponding to various parameters specified in conditional formulas in each of embodiments 1, 2, 3, 4, and 5.

As shown in table 21, various conditional formulas are satisfied in the first embodiment.

In the embodiment, an entrance pupil diameter is denoted as ENPD and the ENPD of the camera optical lens 10 is 0.879 mm. An image height is denoted as IH and the IH is 4.000 mm. Afield of view is denoted as FOV and the FOV in a diagonal is 158.00 degree. The camera optical lens 10 meets the design requirements of large aperture, wide-angle, and ultra-thinness, on-axis and off-axis chromatic aberrations of which are fully corrected, and the camera optical lens 10 has excellent optical characteristics.

Embodiment 2

Figure 5:
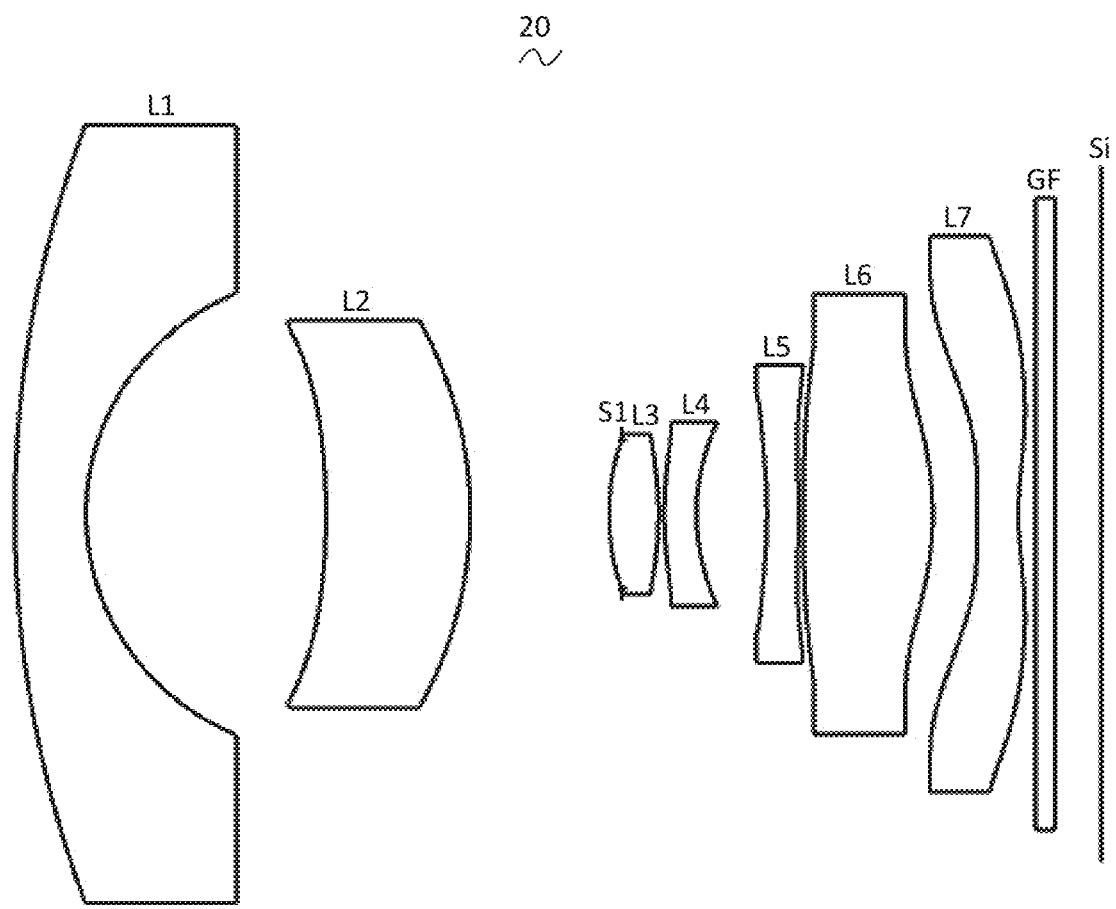
FIG. 5 is a schematic diagram of a structure of a camera optical lens according to a second embodiment of the present disclosure.

FIG. 5 shows a structure of the camera optical lens 20 according to the second embodiment of the present disclosure. The second embodiment is basically the same as the first embodiment, and the meaning of the symbols is the same as that according to the first embodiment, Only differences are listed below.

Table 5 and table 6 show design data, of the camera optical lens 20 according to the second embodiment of the present disclosure.

Table 7 and Table 8 show design data of inflexion points and arrest points of each of the lenses of the camera optical lens 20 according to the second embodiment of the present disclosure,

TABLE 5

| | R | d | | nd | | vd |
|---|---|---|---|---|---|---|
| S1 | ∞ | d0 = | −6.814 | | | |
| R1 | 13.064 | d1 = | 0.800 | nd1 | 1.7780 | v1 44.52 |
| R2 | 2.761 | d2 = | 2.691 | | | |
| R3 | −8.688 | d3 = | 1.620 | nd2 | 2.0300 | v2 33.00 |
| R4 | −4.497 | d4 = | 1.558 | | | |
| R5 | 2.920 | d5 = | 0.552 | nd3 | 1.5357 | v3 76.58 |
| R6 | −4.033 | d6 = | 0.067 | | | |
| R7 | 4.176 | d7 = | 0.360 | nd4 | 1.6610 | v4 20.53 |
| R8 | 2.216 | d8 = | 0.794 | | | |
| R9 | −5.815 | d9 = | 0.350 | nd5 | 1.6610 | v5 20.53 |
| R10 | −14.583 | d10 = | 0.053 | | | |
| R11 | 15.090 | d11 = | 1.454 | nd6 | 1.5444 | v6 55.82 |
| R12 | −4.024 | d12 = | 0.500 | | | |
| R13 | 34.135 | d13 = | 0.460 | nd7 | 1.6610 | v7 20.53 |
| R14 | 3.282 | d14 = | 0.200 | | | |
| R15 | ∞ | d15 = | 0.210 | ndg | 1.5168 | vg 64.17 |
| R16 | ∞ | d16 = | 0.525 | | | |

Table 6 shows aspheric surface data of each of the lenses in the camera optical lens 20 according to the second embodiment of the present disclosure.

TABLE 7

| | Number(s) of inflexion points | Inflexion point position 1 | Inflexion point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 1 | 0.765 | / |
| P4R2 | 0 | / | / |
| P5R1 | 0 | / | / |
| P5R2 | 2 | 0.495 | 1.475 |
| P6R1 | 0 | / | / |
| P6R2 | 2 | 1.165 | 2.315 |
| P7R1 | 2 | 0.145 | 1.685 |
| P7R2 | 2 | 0.545 | 2.875 |

TABLE 6

| | Conic coefficient | Aspheric surface coefficients | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | −1.4368E+01 | −8.7674E−03 | 4.9395E−05 | −1.1070E−04 | 1.2595E−04 | −6.8522E−05 |
| R4 | −5.4743E+00 | −5.6076E−03 | −1.1468E−04 | 2.8458E−04 | −1.4172E−04 | 4.1304E−05 |
| R5 | 2.3313E+00 | 1.5058E−02 | −2.6072E−03 | 2.1296E−03 | −9.4009E−03 | 1.5241E−02 |
| R6 | −3.9626E+00 | 1.4232E−02 | 4.1264E−02 | −1.0353E−01 | 1.1903E−01 | −7.2640E−02 |
| R7 | −6.8695E+00 | −5.0293E−02 | 8.4119E−02 | −1.6019E−01 | 1.8984E−01 | −1.3717E−01 |
| R8 | −2.2679E+00 | −3.9735E−02 | 6.9424E−02 | −7.4965E−02 | 7.1093E−02 | −4.6650E−02 |
| R9 | 1.2831E+01 | 3.5965E−02 | −6.3593E−03 | 2.5532E−02 | −3.9870E−02 | 2.8337E−02 |
| R10 | 2.8151E+01 | 1.3750E−02 | 2.2617E−02 | −1.3812E−03 | −1.7365E−02 | 1.3763E−02 |
| R11 | 8.0647E+00 | −2.8673E−02 | 3.9246E−02 | −2.4305E−02 | 8.3689E−03 | −1.6782E−03 |
| R12 | −6.0178E+00 | −2.5359E−02 | 1.7452E−02 | −3.4896E−03 | 3.2504E−04 | −1.7708E−05 |
| R13 | 5.9972E+01 | −1.3252E−01 | 6.7549E−02 | −2.0566E−02 | 4.1000E−03 | −5.3224E−04 |
| R14 | −2.0838E+01 | −6.3002E−02 | 2.6626E−02 | −7.2925E−03 | 1.3201E−03 | −1.5980E−04 |

| | Conic coefficient | Aspheric surface coefficients | | | |
|---|---|---|---|---|---|
| | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | −1.4368E+01 | 1.9972E−05 | −3.3169E−06 | 2.9463E−07 | −1.0613E−08 |
| R4 | −5.4743E+00 | −7.5662E−06 | 8.7881E−07 | −6.0835E−08 | 2.0491E−09 |
| R5 | 2.3313E+00 | −1.1454E−02 | 2.6601E−03 | 0.0000E+00 | 0.0000E+00 |
| R6 | −3.9626E+00 | 2.0498E−02 | −2.1539E−03 | 0.0000E+00 | 0.0000E+00 |
| R7 | −6.8695E+00 | 5.3935E−02 | −9.1848E−03 | −1.2168E−04 | 1.5920E−04 |
| R8 | −2.2679E+00 | 2.1545E−02 | −6.4422E−03 | 1.0712E−03 | −7.3743E−05 |
| R9 | 1.2831E+01 | −1.0927E−02 | 2.3395E−03 | −2.6195E−04 | 1.1992E−05 |
| R10 | 2.8151E+01 | −5.0813E−03 | 1.0162E−03 | −1.0583E−04 | 4.4891E−06 |
| R11 | 8.0647E+00 | 1.8810E−04 | −9.6470E−06 | 3.4236E−09 | 1.2832E−08 |
| R12 | −6.0178E+00 | 1.3153E−06 | −1.2942E−07 | 6.5168E−09 | −1.1535E−10 |
| R13 | 5.9972E+01 | 4.4225E−05 | −2.2589E−06 | 6.4354E−08 | −7.8033E−10 |
| R14 | −2.0838E+01 | 1.2703E−05 | −6.2767E−07 | 1.7272E−08 | −2.0069E−10 |

TABLE 8

| | Number(s) of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 1 | 0.795 | / |
| P6R1 | 0 | / | / |
| P6R2 | 2 | 2.235 | 2.385 |
| P7R1 | 2 | 0.245 | 2.835 |
| P7R2 | 1 | 1.195 | / |

Figure 6:
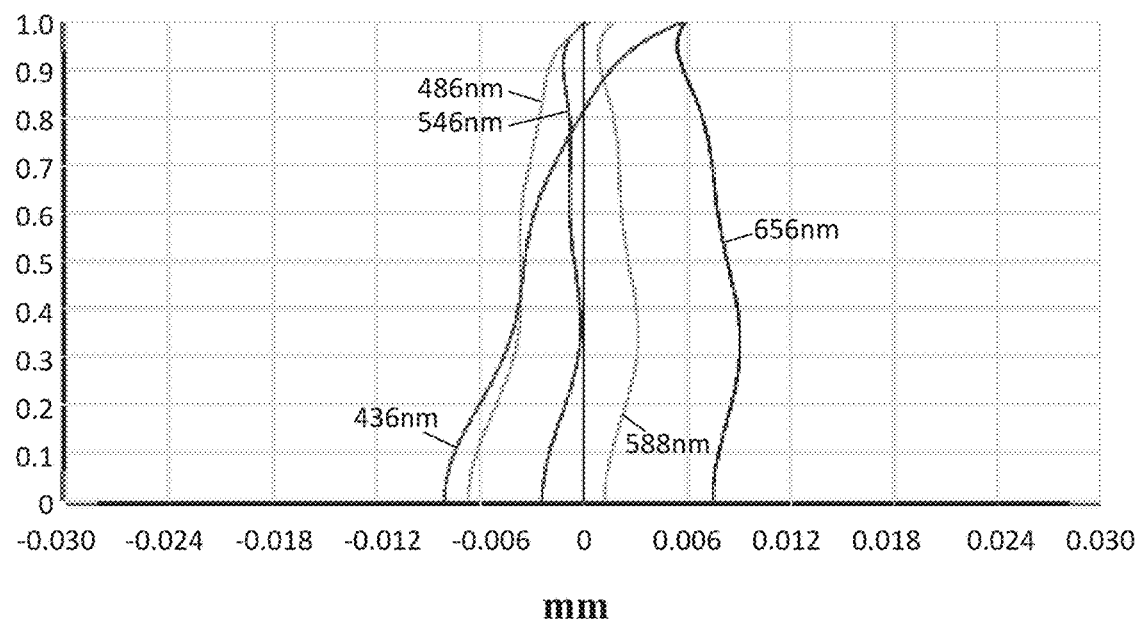
FIG. 6 is a schematic diagram of a longitudinal aberration of the camera optical lens shown in FIG. 5.
Figure 7:
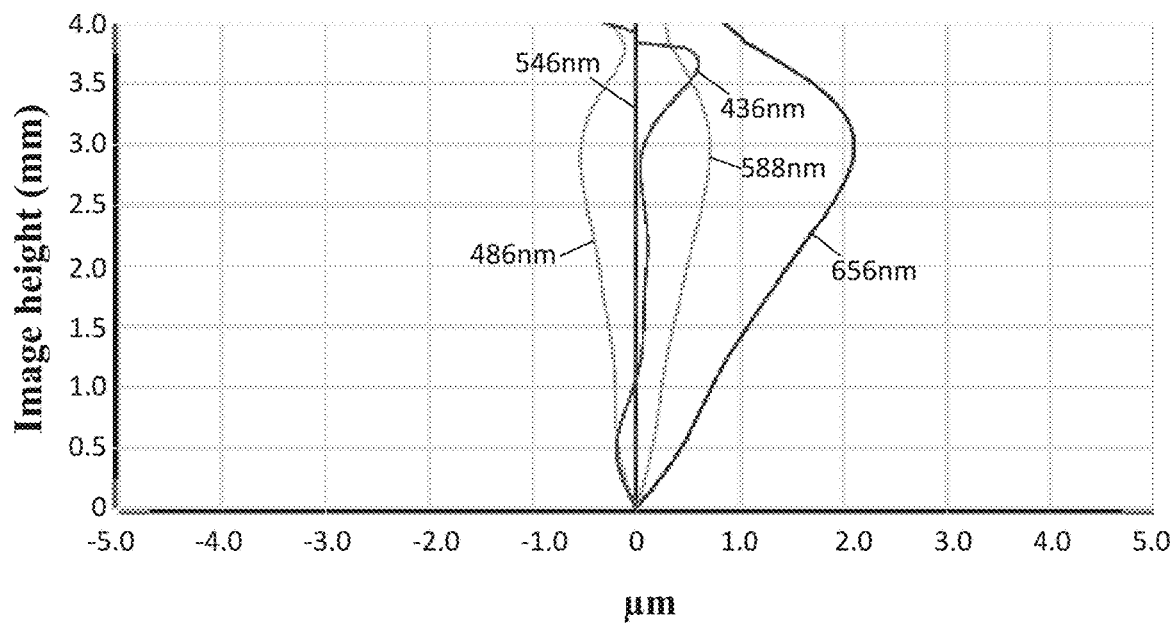
FIG. 7 is a schematic diagram of a lateral color of the camera optical lens shown in FIG. 5.
Figure 8:
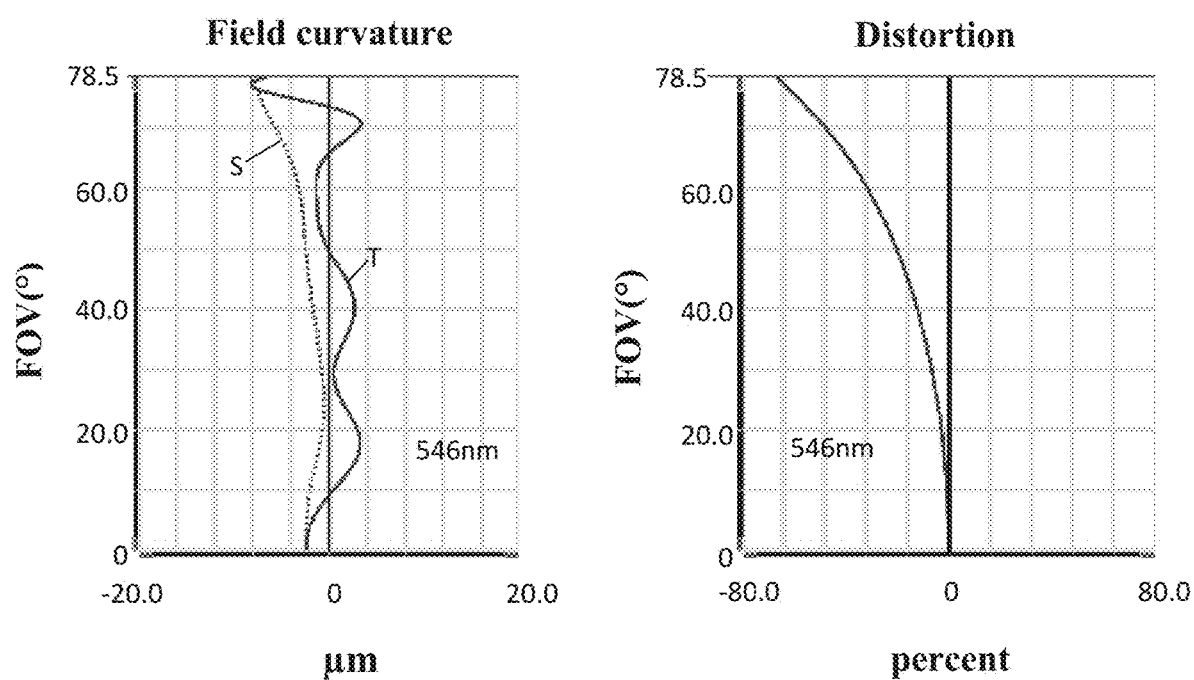
FIG. 8 is a schematic diagram of a field curvature and a distortion of the camera optical lens shown in FIG. 5.

FIG. 6 and FIG. 7 illustrate a longitudinal aberration and a lateral color of the lights having the wavelengths of 656 nm, 588 nm, 546 nm, 486 nm, and 436 nm after passing the camera optical lens 20 according to the second embodiment of the present disclosure, respectively. FIG. 8 illustrates a field curvature and a distortion of the light having the wavelength of 546 nm after passing the camera optical lens 20 according to the second embodiment of the present disclosure. A field curvature S in FIG. 8 is a field curvature in a sagittal direction, and T is a field curvature in a meridian direction.

As shown in table 21, the second embodiment satisfies various conditional formulas.

In the embodiment, an entrance pupil diameter is denoted as ENPD and the ENPD of the camera optical lens 20 is 0.933 mm. An image height, is denoted as IH and the IH is 4.000 mm. A field of view is denoted as FOV and the FOV in a diagonal is 157.00 degree. The camera optical lens 20 meets the design requirements of large aperture, wide-angle, and ultra-thinness, the on-axis and off-axis chromatic aberrations of which are fully corrected, and the camera optical lens 20 has excellent optical characteristics.

Embodiment 3

Figure 9:
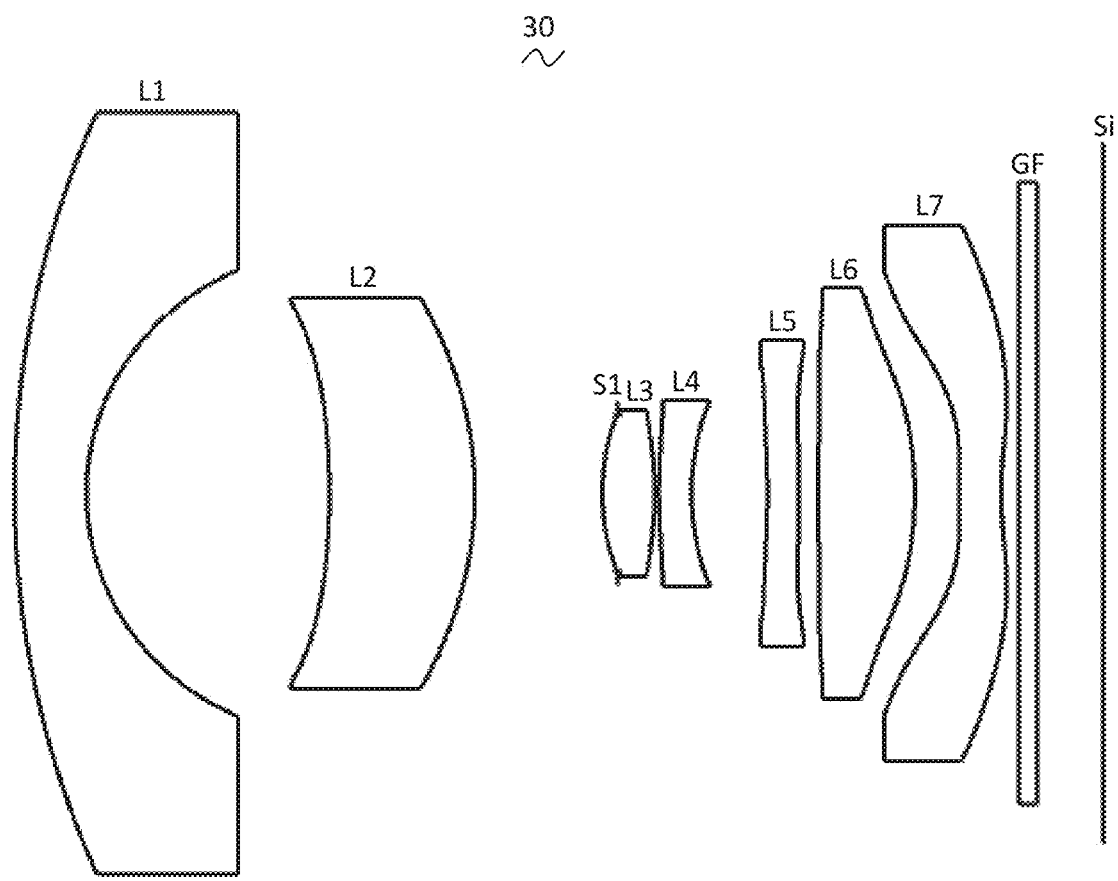
FIG. 9 is a schematic diagram of a structure of a camera optical lens according to a third embodiment of the present disclosure.

FIG. 9 shows a structure of the camera optical lens 30 according to the third embodiment of the present disclosure. The third embodiment is basically the same as the first embodiment, and the meaning of the symbols is the same as that according to the first embodiment. Only differences are listed below.

In the third embodiment, the object side surface of the seventh lens L7 is concave in a paraxial region.

Table 9 and table 10 show design data of the camera optical lens 30 according to the third embodiment of the present disclosure.

TABLE 9

| | R | d | nd | vd |
|---|---|---|---|---|
| S1 | ∞ | d0 = -6.711 | | |
| R1 | 10.759 | d1 = 0.800 | nd1 1.9180 | v1 44.52 |
| R2 | 2.763 | d2 = 2.702 | | |
| R3 | -8.849 | d3 = 1.620 | nd2 1.8800 | v2 33.00 |
| R4 | -4.109 | d4 = 1.417 | | |
| R5 | 2.777 | d5 = 0.583 | nd3 1.5357 | v3 67.34 |
| R6 | -4.026 | d6 = 0.050 | | |
| R7 | 7.325 | d7 = 0.360 | nd4 1.6610 | v4 20.53 |
| R8 | 2.654 | d8 = 0.843 | | |
| R9 | -11.024 | d9 = 0.350 | nd5 1.6610 | v5 20.53 |
| R10 | -25.190 | d10 = 0.212 | | |
| R11 | 12.097 | d11 = 1.076 | nd6 1.5444 | v6 55.82 |
| R12 | -4.744 | d12 = 0.500 | | |
| R13 | -285.833 | d13 = 0.460 | nd7 1.6610 | v7 20.53 |
| R14 | 3.428 | d14 = 0.200 | | |
| R15 | ∞ | d15 = 0.210 | ndg 1.5168 | vg 64.17 |
| R16 | ∞ | d16 = 0.729 | | |

Table 10 shows aspheric surface data of each of the lenses in the camera optical lens 30 according to the third embodiment of the present disclosure.

TABLE 10

| | Conic coefficient | Aspheric surface coefficients | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | -1.5373E+01 | -9.3638E-03 | 5.7432E-04 | -4.1768E-04 | 2.9956E-04 | -1.4402E-04 |
| R4 | -5.2277E+00 | -5.6276E-03 | 4.9366E-06 | 2.1970E-04 | -1.4555E-04 | 5.1585E-05 |
| R5 | 2.0281E+00 | 1.6984E-02 | -3.9833E-03 | 2.8943E-03 | -1.5484E-02 | 2.3169E-02 |
| R6 | -4.1453E+00 | 1.9940E-02 | 2.5278E-02 | -8.4754E-02 | 1.0821E-01 | -6.9483E-02 |
| R7 | 4.7575E+00 | -5.4567E-02 | 7.5315E-02 | -1.3488E-01 | 1.6947E-01 | -1.2226E-01 |
| R8 | -1.1638E+00 | -4.8497E-02 | 7.0197E-02 | -6.2138E-02 | 6.0018E-02 | -3.8149E-02 |
| R9 | 4.6541E+01 | 1.5448E-03 | 3.2623E-02 | -2.3949E-02 | 1.0415E-02 | -5.4986E-03 |
| R10 | 9.0000E+01 | -2.4674E-02 | 4.7672E-02 | -1.2062E-02 | -8.0909E-03 | 6.8868E-03 |
| R11 | -8.8785E+01 | -4.4066E-02 | 2.5763E-02 | -5.2347E-03 | -8.5405E-04 | 7.6265E-04 |
| R12 | -3.3219E+00 | -3.0310E-02 | 8.6252E-03 | -2.5050E-03 | 1.4266E-03 | -4.2094E-04 |
| R13 | 9.0000E+01 | -1.3352E-01 | 5.1307E-02 | -1.3628E-02 | 2.8790E-03 | -4.1594E-04 |
| R14 | -1.9184E+01 | -7.0559E-02 | 2.7538E-02 | -7.7084E-03 | 1.5448E-03 | -2.1474E-04 |

TABLE 10-continued

| | Conic coefficient | Aspheric surface coefficients | | | |
|---|---|---|---|---|---|
| | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | −1.5373E+01 | 4.1442E−05 | −7.0701E−06 | 6.5981E−07 | −2.5554E−08 |
| R4 | −5.2277E+00 | −1.1148E−05 | 1.4988E−06 | −1.1712E−07 | 4.2707E−09 |
| R5 | 2.0281E+00 | −1.5112E−02 | 3.2250E−03 | 0.0000E+00 | 0.0000E+00 |
| R6 | −4.1453E+00 | 2.0084E−02 | −2.1389E−03 | 0.0000E+00 | 0.0000E+00 |
| R7 | 4.7575E+00 | 4.4483E−02 | −5.7015E−03 | −7.5565E−04 | 2.0379E−04 |
| R8 | −1.1638E+00 | 1.7037E−02 | −5.1603E−03 | 8.9319E−04 | −6.4224E−05 |
| R9 | 4.6541E+01 | 2.8945E−03 | −9.7362E−04 | 1.6775E−04 | −1.1288E−05 |
| R10 | 9.0000E+01 | −2.3212E−03 | 4.1880E−04 | −3.9477E−05 | 1.5216E−06 |
| R11 | −8.8785E+01 | −1.9792E−04 | 2.6599E−05 | −1.8558E−06 | 5.2884E−08 |
| R12 | −3.3219E+00 | 6.1143E−05 | −4.6789E−06 | 1.8167E−07 | −2.8216E−09 |
| R13 | 9.0000E+01 | 3.6585E−05 | −1.8351E−06 | 4.7183E−08 | −4.6176E−10 |
| R14 | −1.9184E+01 | 1.9963E−05 | −1.1712E−06 | 3.8701E−08 | −5.4337E−10 |

Table 11 and Table 12 show design data of inflexion points and arrest points of each of the lenses of the camera optical lens 30 according to the third embodiment of the present disclosure.

TABLE 11

| | Number(s) of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 0 | / | / | / |
| P3R2 | 0 | / | / | / |
| P4R1 | 1 | 0.755 | / | / |
| P4R2 | 0 | / | / | / |
| P5R1 | 2 | 0.705 | 1.035 | / |
| P5R2 | 2 | 0.615 | 1.515 | / |
| P6R1 | 3 | 0.425 | 1.055 | 2.025 |
| P6R2 | 2 | 1.525 | 2.055 | / |
| P7R1 | 2 | 1.695 | 2.375 | / |
| P7R2 | 1 | 0.575 | / | / |

TABLE 12

| | Number(s) of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 1 | 0.895 | / |
| P6R1 | 2 | 1.005 | 1.105 |
| P6R2 | 0 | / | / |
| P7R1 | 0 | / | / |
| P7R2 | 1 | 1.065 | / |

Figure 10:
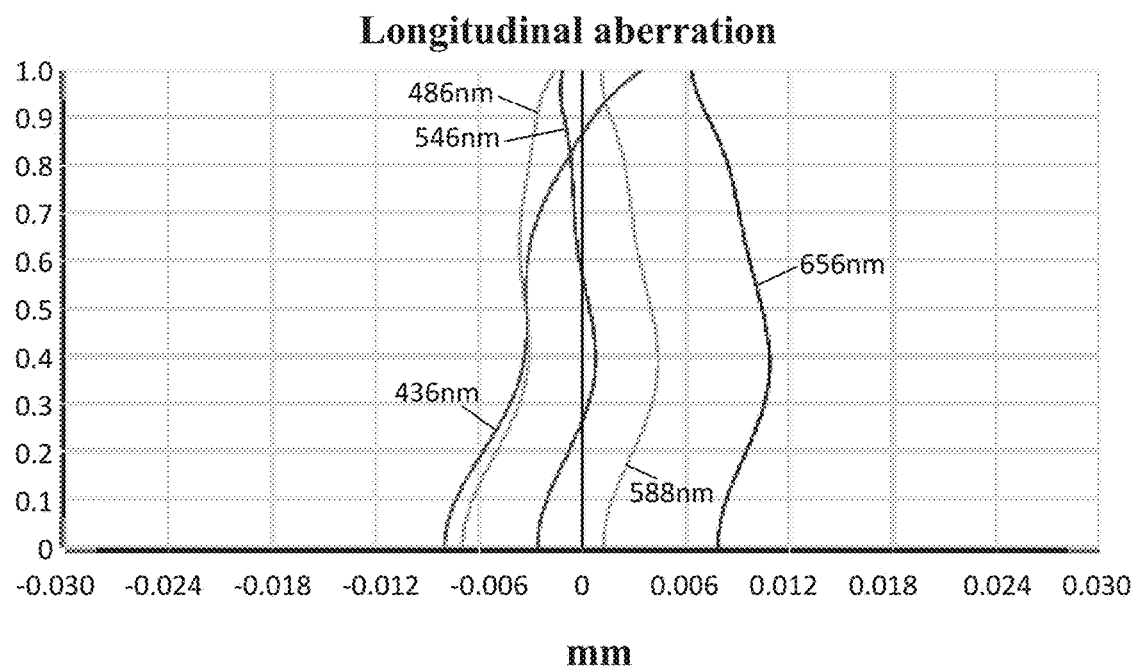
FIG. 10 is a schematic diagram of a longitudinal aberration of the camera optical lens shown in FIG. 9.
Figure 11:
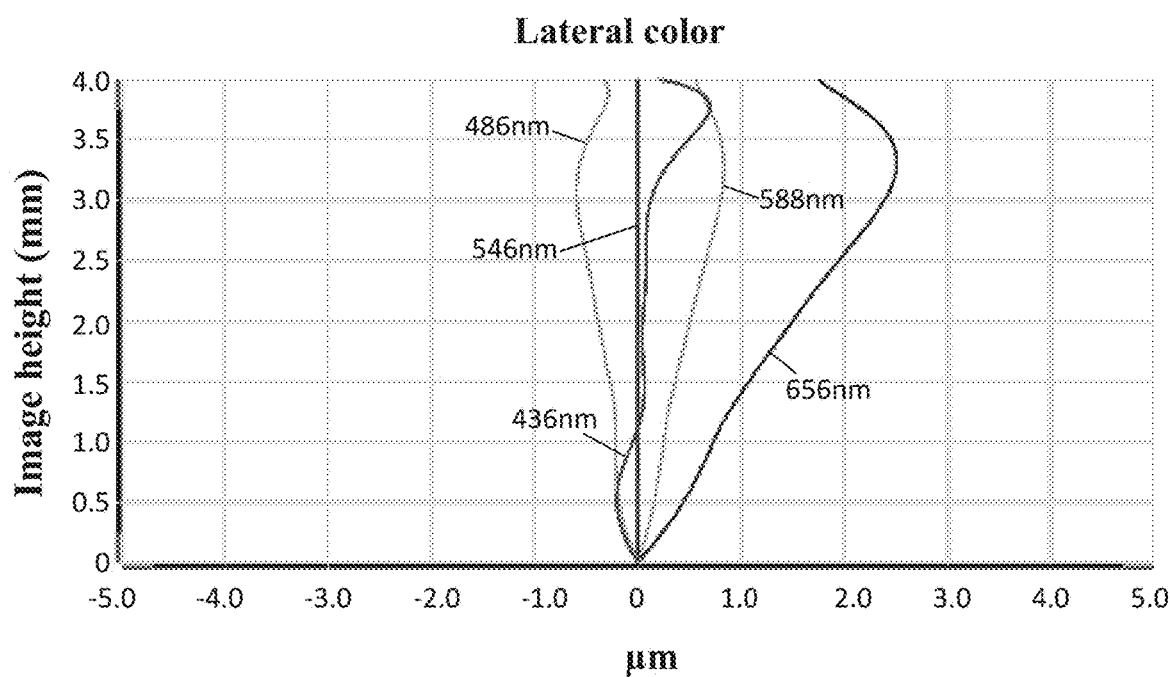
FIG. 11 is a schematic diagram of a lateral color of the camera optical lens shown in FIG. 9.
Figure 12:
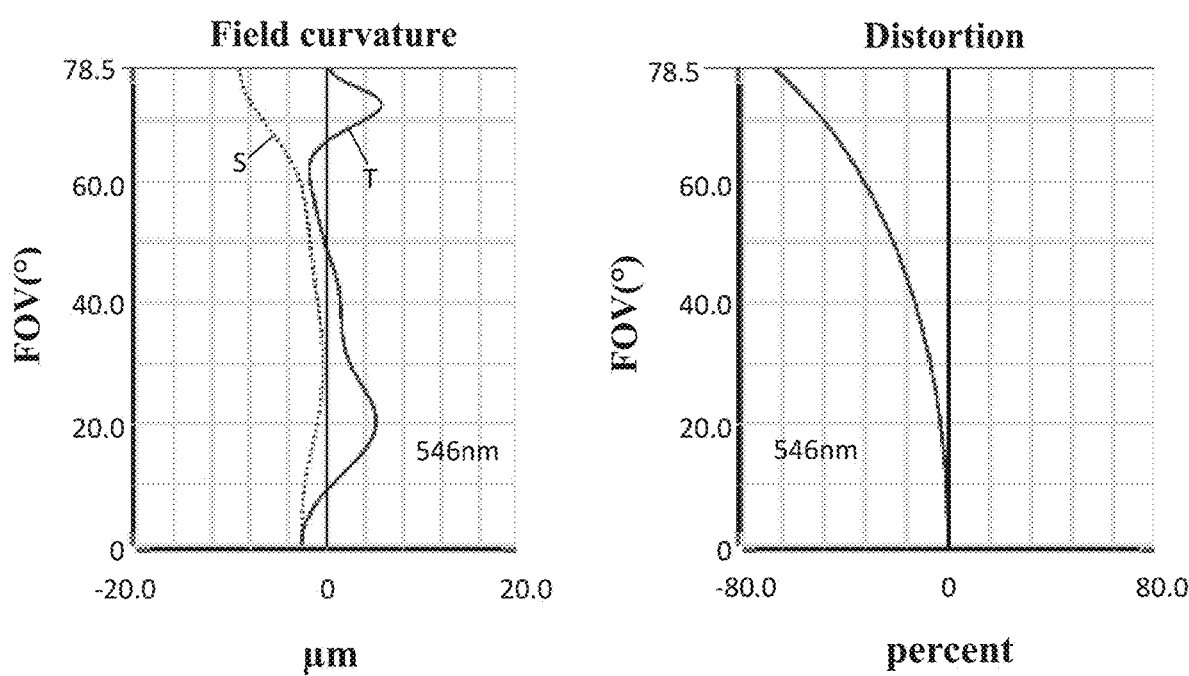
FIG. 12 is a schematic diagram of a field curvature and a distortion of the camera optical lens shown in FIG. 9.

FIG. 10 and FIG. 11 illustrate a longitudinal aberration and a lateral color of the lights having the wavelengths of 656 nm, 588 nm, 546 nm, 486 nm, and 436 nm after passing the camera optical lens 30 according to the third embodiment of the present disclosure, respectively. FIG. 12 illustrates a field curvature and a distortion of the light having the wavelength of 546 nm after passing the camera optical lens 30 according to the third embodiment of the present disclosure. A field curvature S in FIG. 12 is a field curvature in a sagittal direction, and T is a field curvature in a meridian direction.

The following table 21 lists numerical values corresponding to each conditional formula in the embodiment according to the above-mentioned conditional formulas. Obviously, the camera optical lens 30 of the embodiment satisfies the above-mentioned conditional formulas.

In the embodiment, an entrance pupil diameter is denoted as ENPD and the ENPD of the camera optical lens 30 is 0.933 mm. An image height is denoted as IH and the IH is 4.000 mm. A field of view is denoted as FOV and the FOV in the diagonal is 157.00 degree. The camera optical lens 30 meets the design requirements of the large aperture, wide-angle, and ultra-thinness, the on-axis and off-axis chromatic aberrations of which are fully corrected, and the camera optical lens 30 has excellent optical characteristics.

Embodiment 4

Figure 13:
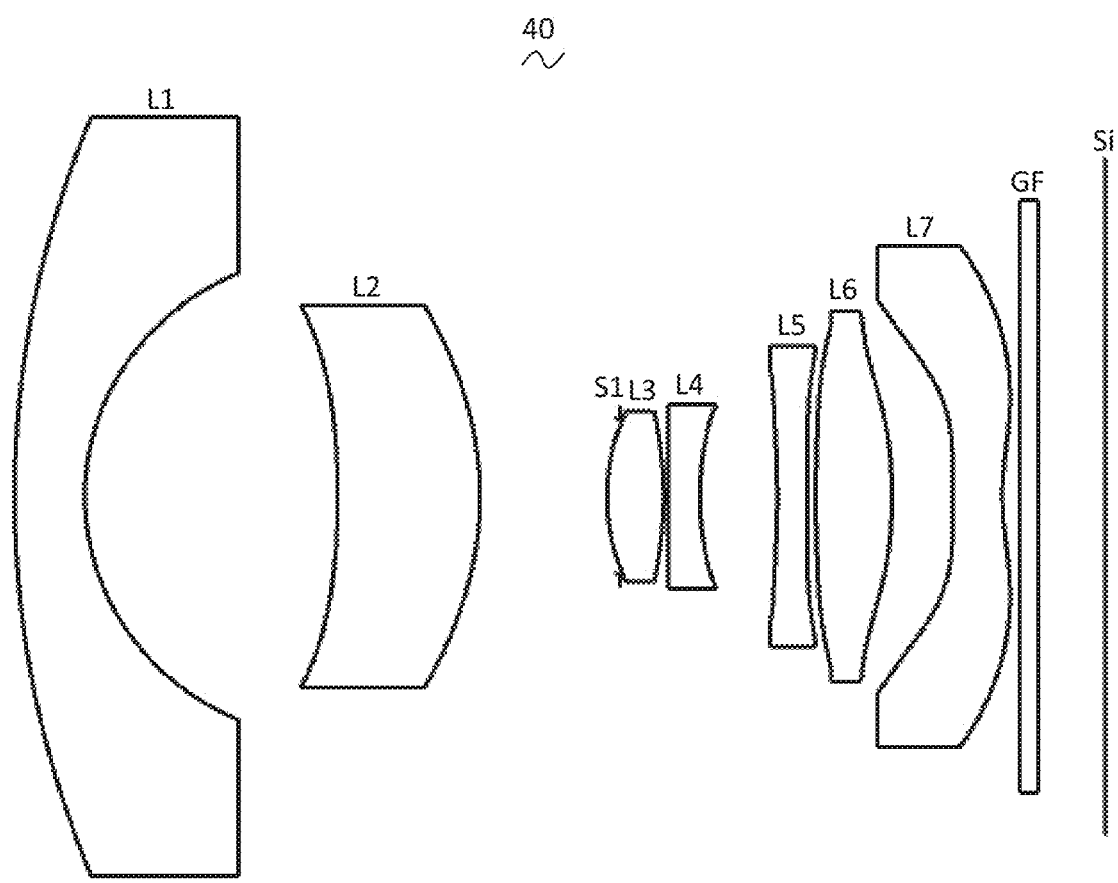
FIG. 13 is a schematic diagram of a structure of a camera optical lens according to a fourth embodiment of the present disclosure.

FIG. 13 shows a structure of the camera optical lens 40 according to the fourth embodiment of the present disclosure. The fourth embodiment is basically the same as the first embodiment, and the meaning of the symbols is the same as that according to the first embodiment. Only differences are listed below.

In the embodiment, the image side surface of the fifth lens L5 is concave in a paraxial region.

Table 13 and table 14 show design data of the camera optical lens 40 according to the fourth embodiment of the present disclosure.

TABLE 13

| | R | d | | nd | | vd |
|---|---|---|---|---|---|---|
| S1 | ∞ | d0 = | −6.880 | | | |
| R1 | 11.974 | d1 = | 0.800 | nd1 | 1.9180 | v1 44.52 |
| R2 | 2.868 | d2 = | 2.871 | | | |
| R3 | −9.585 | d3 = | 1.620 | nd2 | 1.7200 | v2 33.00 |
| R4 | −3.878 | d4 = | 1.443 | | | |
| R5 | 2.652 | d5 = | 0.644 | nd3 | 1.5357 | v3 57.89 |
| R6 | −3.955 | d6 = | 0.050 | | | |
| R7 | 16.420 | d7 = | 0.360 | nd4 | 1.6610 | v4 20.53 |
| R8 | 3.214 | d8 = | 0.878 | | | |
| R9 | −11.646 | d9 = | 0.350 | nd5 | 1.6610 | v5 20.53 |
| R10 | 779.502 | d10 = | 0.089 | | | |
| R11 | 8.189 | d11 = | 0.867 | nd6 | 1.5444 | v6 55.82 |
| R12 | −6.552 | d12 = | 0.687 | | | |
| R13 | 14.403 | d13 = | 0.570 | nd7 | 1.6610 | v7 20.53 |
| R14 | 3.082 | d14 = | 0.200 | | | |

TABLE 13-continued

| | R | d | nd | vd |
|---|---|---|---|---|
| R15 | ∞ | d15 = 0.210 | ndg 1.5168 | vg 64.17 |
| R16 | ∞ | d16 = 0.760 | | |

Table 14 shows aspheric surface data. Of each of the lenses in the camera optical lens 40 according to the fourth embodiment of the present disclosure.

TABLE 14

| | Conic coefficient | Aspheric surface coefficients | | | | |
|---|---|---|---|---|---|---|
| | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | −2.9622E+01 | −8.9988E−03 | 5.5040E−04 | −4.0349E−04 | 3.0408E−04 | −1.4509E−04 |
| R4 | −5.4685E+00 | −5.0176E−03 | −6.2672E−04 | 6.8762E−04 | −3.9007E−04 | 1.4035E−04 |
| R5 | 1.8977E+00 | 1.7202E−02 | −5.2564E−03 | 4.4939E−03 | −1.6339E−02 | 2.1719E−02 |
| R6 | −4.3159E+00 | 1.2978E−02 | 3.7018E−02 | −9.8993E−02 | 1.1944E−01 | −7.4066E−02 |
| R7 | 2.1464E+01 | −6.0978E−02 | 8.7736E−02 | −1.4072E−01 | 1.6527E−01 | −1.0903E−01 |
| R8 | 4.7100E−01 | −5.4161E−02 | 6.2055E−02 | −2.9615E−02 | 1.3205E−02 | −1.1081E−04 |
| R9 | 4.9809E+01 | 1.4409E−02 | −1.3723E−03 | 5.5993E−03 | −1.5146E−03 | −4.3264E−03 |
| R10 | −9.0000E+01 | −3.3865E−02 | 5.1193E−02 | −1.5691E−02 | −5.0318E−03 | 5.5741E−03 |
| R11 | −1.7963E+01 | −7.8374E−02 | 7.6884E−02 | −3.6742E−02 | 1.0268E−02 | −1.6601E−03 |
| R12 | 7.1888E−01 | −4.5569E−02 | 2.7490E−02 | −8.8865E−03 | 2.3535E−03 | −4.5051E−04 |
| R13 | −5.6498E+01 | −1.3204E−01 | 3.2179E−02 | 5.1382E−03 | −7.2476E−03 | 2.6496E−03 |
| R14 | −5.7278E+00 | −9.3194E−02 | 3.7636E−02 | −1.0819E−02 | 2.1524E−03 | −2.9627E−04 |

| | Conic coefficient | Aspheric surface coefficients | | | |
|---|---|---|---|---|---|
| | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | −2.9622E+01 | 4.0859E−05 | −6.8080E−06 | 6.2147E−07 | −2.3564E−08 |
| R4 | −5.4685E+00 | −3.3213E−05 | 5.0728E−06 | −4.5433E−07 | 1.8332E−08 |
| R5 | 1.8977E+00 | −1.3393E−02 | 2.7735E−03 | 0.0000E+00 | 0.0000E+00 |
| R6 | −4.3159E+00 | 2.0973E−02 | −2.2037E−03 | 0.0000E+00 | 0.0000E+00 |
| R7 | 2.1464E+01 | 3.3463E−02 | −1.5368E−03 | −1.5001E−03 | 2.5502E−04 |
| R8 | 4.7100E−01 | 1.7420E−04 | −1.1262E−04 | 4.0481E−04 | −4.0909E−05 |
| R9 | 4.9809E+01 | 4.0364E−03 | −1.5618E−03 | 2.8469E−04 | −1.9924E−05 |
| R10 | −9.0000E+01 | −2.0233E−03 | 3.8241E−04 | −3.7255E−05 | 1.4709E−06 |
| R11 | −1.7963E+01 | 1.3241E−04 | −8.2644E−07 | −5.8870E−07 | 2.7914E−08 |
| R12 | 7.1888E−01 | 5.3542E−05 | −3.6867E−06 | 1.3414E−07 | −1.9891E−09 |
| R13 | −5.6498E+01 | −4.9366E−04 | 4.9922E−05 | −2.6005E−06 | 5.4689E−08 |
| R14 | −5.7278E+00 | 2.7794E−05 | −1.6837E−06 | 5.8381E−08 | −8.6755E−10 |

Table 15 and Table 16 show design data of inflexion points and arrest points of each of the lenses of the camera optical lens 40 according to the fourth embodiment of the present disclosure.

TABLE 15

| | Number(s) of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 0 | / | / | / |
| P3R2 | 0 | / | / | / |
| P4R1 | 1 | 0.355 | / | / |
| P4R2 | 0 | / | / | / |
| P5R1 | 2 | 0.815 | 1.015 | / |
| P5R2 | 3 | 0.065 | 0.575 | 1.525 |
| P6R1 | 2 | 0.465 | 0.705 | / |
| P6R2 | 2 | 1.355 | 2.125 | / |
| P7R1 | 3 | 0.215 | 1.835 | 2.155 |
| P7R2 | 1 | 0.575 | / | / |

TABLE 16

| | Number(s) of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |

TABLE 16-continued

| | Number(s) of arrest points | Arrest point position 1 | Arrest point position 2 |
|---|---|---|---|
| P3R2 | 0 | / | / |
| P4R1 | 1 | 0.715 | / |
| P4R2 | 0 | / | / |
| P5R1 | 0 | / | / |
| P5R2 | 2 | 0.095 | 0.765 |
| P6R1 | 0 | / | / |
| P6R2 | 0 | / | / |
| P7R1 | 1 | 0.365 | / |
| P7R2 | 1 | 1.175 | / |

Figure 14:
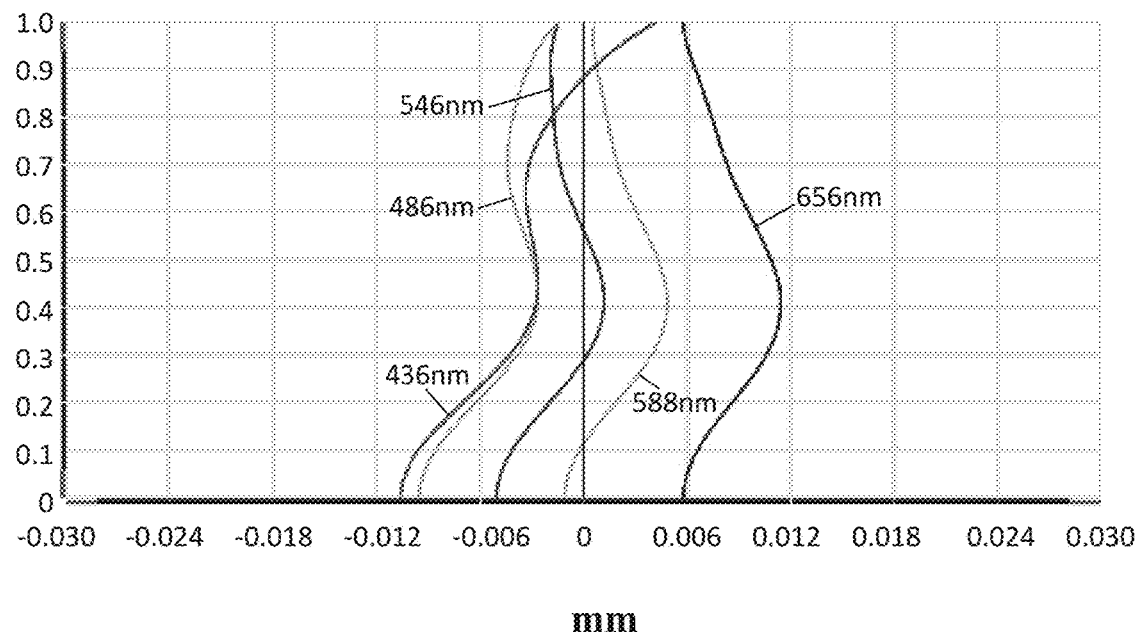
FIG. 14 is a schematic diagram of a longitudinal aberration of the camera optical lens shown in FIG. 13.
Figure 15:
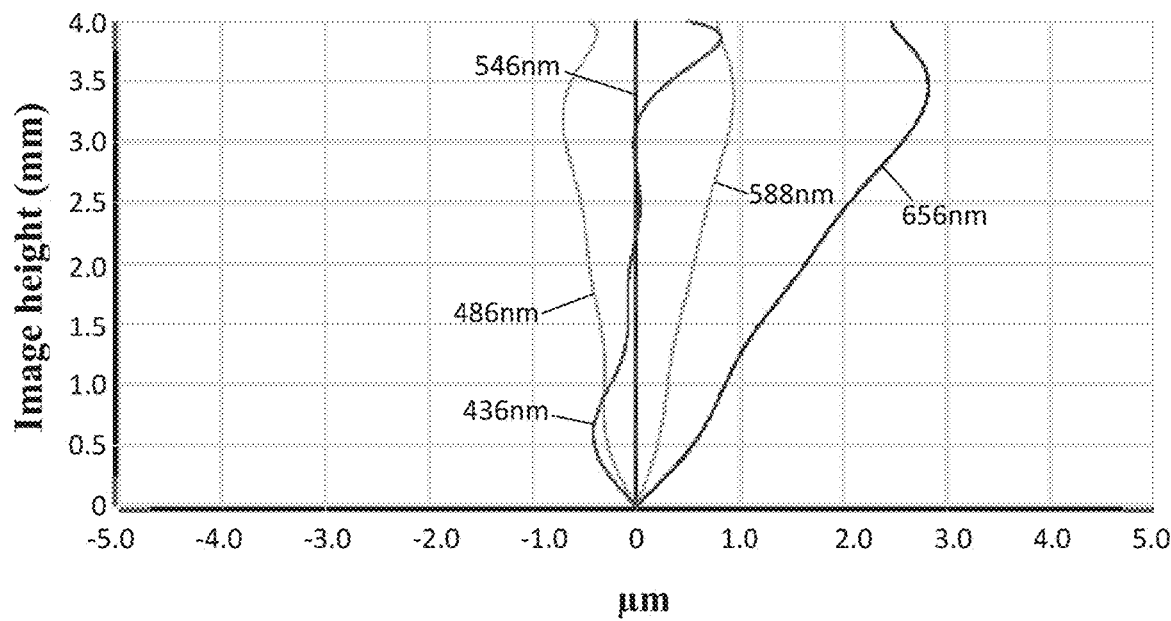
FIG. 15 is a schematic diagram of a lateral color of the camera optical lens shown in FIG. 13.
Figure 16:
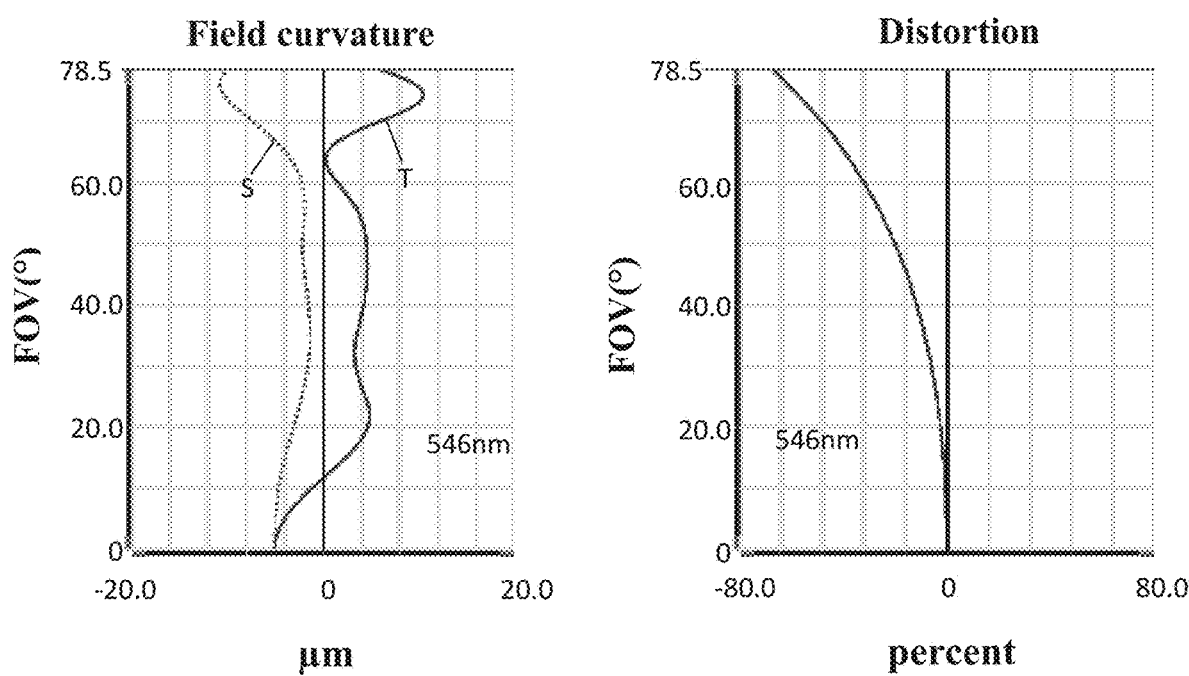
FIG. 16 is a schematic diagram of a field curvature and a distortion of the camera optical lens shown in FIG. 13.

FIG. 14 and FIG. 15 illustrate a longitudinal aberration and a lateral color of the lights having the wavelengths of 656 nm, 588 nm, 546 nm, 486 nm, and 436 nm after passing the camera optical lens 40 according to the fourth embodiment of the present disclosure, respectively. FIG. 16 illustrates a field curvature and a distortion of the light having the wavelength of 546 nm after passing the camera optical lens 40 according to the fourth embodiment of the present disclosure. A field curvature S in FIG. 16 is a field curvature in a sagittal direction, and T is a field curvature in a meridian direction.

The following table 21 lists numerical values corresponding to each conditional formula in the embodiment according to the above-mentioned conditional formulas. Obviously, the camera optical lens 40 of the embodiment satisfies the above-mentioned conditional formulas.

In the embodiment, an entrance pupil diameter is denoted as ENPD and the ENPD of the camera optical lens 40 is 0.933 mm. An image height is denoted as IH and the IH is 4.000 mm. A field of view is denoted as FOV and the FOV in the diagonal is 157.00 degree. The camera optical lens 40 meets the design requirements of the large aperture, wide-angle, and ultra-thinness, the on-axis and off-axis chromatic aberrations of which are fully corrected, and the camera optical lens 40 has excellent optical characteristics.

Embodiment 5

Figure 17:
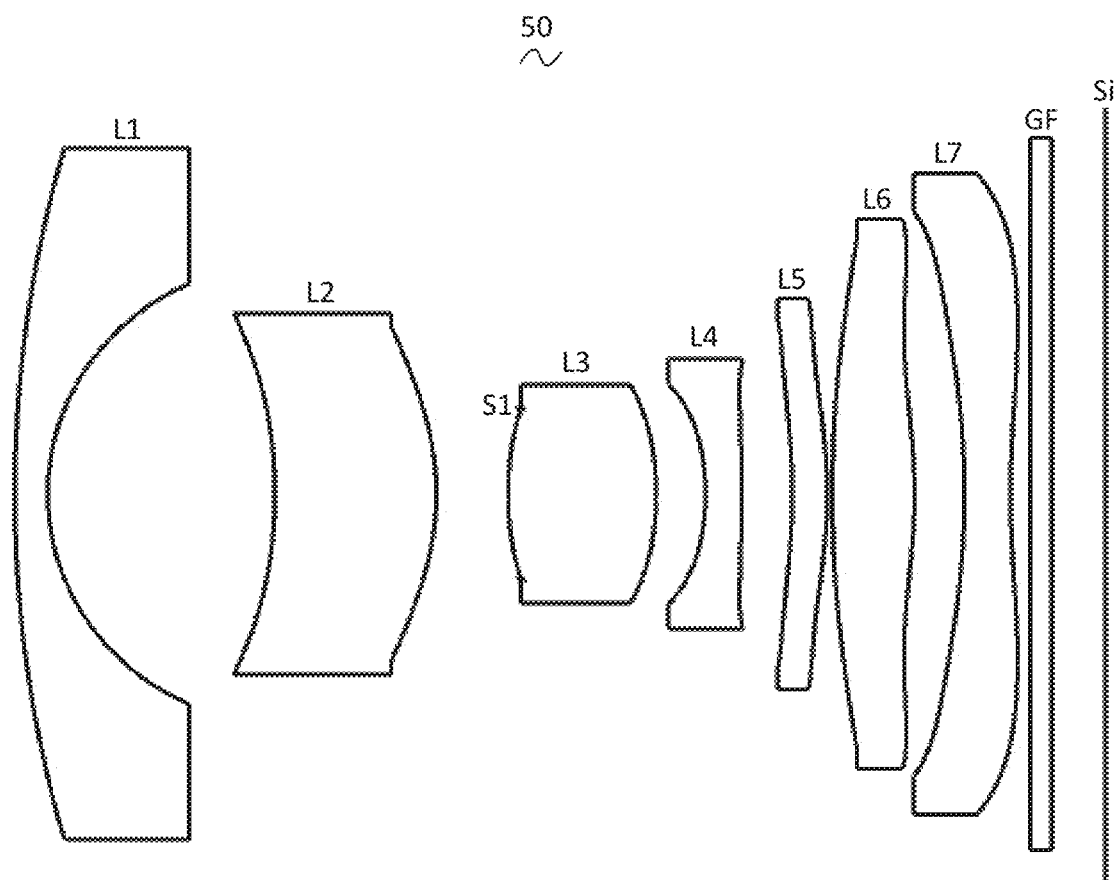
FIG. 17 is a schematic diagram of a structure of a camera optical lens according to a fifth embodiment of the present disclosure.

FIG. 17 shows a structure of the camera optical lens 50 according to the fifth embodiment of the present disclosure. The fifth embodiment is basically the same as the first embodiment, and the meaning of the symbols is the same as that according to the first embodiment. Only differences are listed below.

In the embodiment, the fifth lens L5 has a positive refractive power, the object side surface of the fourth lens L4 is concave in a paraxial region, the image side surface of the fourth lens L4 is convex in a paraxial region, and the object side surface of the seventh lens L7 is concave in a paraxial region.

Table 17 and table 18 show design data of the camera optical lens 50 according to the fifth embodiment of the present disclosure.

TABLE 17

|  | R | d | nd |  | vd |  |
|---|---|---|---|---|---|---|
| S1 | ∞ | d0 = −5.073 |  |  |  |  |
| R1 | 13.253 | d1 = 0.330 | nd1 | 1.6779 | v1 | 55.52 |
| R2 | 2.395 | d2 = 2.274 |  |  |  |  |
| R3 | −5.165 | d3 = 1.620 | nd2 | 1.7504 | v2 | 44.94 |
| R4 | −2.767 | d4 = 0.718 |  |  |  |  |
| R5 | 3.599 | d5 = 1.481 | nd3 | 1.5357 | v3 | 74.64 |
| R6 | −3.047 | d6 = 0.492 |  |  |  |  |
| R7 | −2.783 | d7 = 0.360 | nd4 | 1.6610 | v4 | 20.53 |
| R8 | −89.905 | d8 = 0.511 |  |  |  |  |
| R9 | −6.197 | d9 = 0.350 | nd5 | 1.6610 | v5 | 20.53 |
| R10 | −5.008 | d10 = 0.050 |  |  |  |  |
| R11 | 12.709 | d11 = 0.824 | nd6 | 1.5444 | v6 | 55.82 |
| R12 | −5.920 | d12 = 0.500 |  |  |  |  |
| R13 | −8.758 | d13 = 0.460 | nd7 | 1.6610 | v7 | 20.53 |
| R14 | 8.983 | d14 = 0.200 |  |  |  |  |
| R15 | ∞ | d15 = 0.210 | ndg | 1.5168 | vg | 64.17 |
| R16 | ∞ | d16 = 0.542 |  |  |  |  |

Table 18 shows aspheric surface data of each of the lenses in the camera optical lens 50 according to the fifth embodiment of the present disclosure.

TABLE 18

|  | Conic coefficient | Aspheric surface coefficients | | | | |
|---|---|---|---|---|---|---|
|  | k | A4 | A6 | A8 | A10 | A12 |
| R1 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R3 | −6.5886E+00 | −1.5654E−02 | 2.0411E−03 | −4.8902E−05 | −3.8816E−06 | −1.1093E−06 |
| R4 | −5.9157E+00 | −1.1723E−02 | 2.8465E−03 | −4.1238E−04 | 4.6875E−05 | −1.5920E−06 |
| R5 | 4.4832E+00 | 2.5132E−02 | −3.9562E−03 | −4.4155E−02 | 7.7365E−02 | −7.5519E−02 |
| R6 | −5.1215E−01 | −1.3145E−02 | −8.6197E−03 | −5.0372E−03 | 4.0245E−03 | −3.0007E−03 |
| R7 | −2.0411E+00 | −8.2499E−02 | 4.8154E−03 | −9.1537E−03 | 1.3909E−02 | −1.3237E−02 |
| R8 | 7.6328E+01 | −2.6761E−02 | 1.0709E−02 | 9.0965E−03 | −5.1015E−03 | 1.4998E−03 |
| R9 | −4.2876E+01 | 1.9206E−03 | 9.6155E−04 | 1.4325E−03 | −1.0813E−03 | 2.7940E−04 |
| R10 | −1.8949E+01 | 1.3970E−03 | 5.0164E−03 | −1.1363E−03 | −3.4777E−06 | 1.7705E−05 |
| R11 | 1.4912E+01 | −4.4703E−03 | 2.7728E−03 | −1.0759E−03 | 2.0595E−04 | −2.0971E−05 |
| R12 | −1.2618E+01 | 1.2401E−02 | −2.1848E−04 | 2.3816E−04 | −1.5223E−04 | 2.6010E−05 |
| R13 | 2.8567E+00 | 2.4324E−03 | −9.4698E−04 | 5.2660E−04 | −1.0841E−04 | 1.0231E−05 |
| R14 | −2.6307E+01 | −8.5118E−03 | −1.1948E−04 | 2.7761E−04 | −5.1637E−05 | 4.1188E−06 |

|  | Conic coefficient | Aspheric surface coefficients | | | |
|---|---|---|---|---|---|
|  | k | A14 | A16 | A18 | A20 |
| R1 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 |
| R3 | −6.5886E+00 | 1.1296E−07 | −4.6470E−09 | 0.0000E+00 | 0.0000E+00 |
| R4 | −5.9157E+00 | 1.9252E−07 | −9.2716E−09 | 0.0000E+00 | 0.0000E+00 |
| R5 | 4.4832E+00 | 3.5460E−02 | −6.6458E−03 | 0.0000E+00 | 0.0000E+00 |
| R6 | −5.1215E−01 | 7.2869E−04 | −6.9914E−05 | 0.0000E+00 | 0.0000E+00 |
| R7 | −2.0411E+00 | 4.9508E−03 | −6.9073E−04 | 0.0000E+00 | 0.0000E+00 |
| R8 | 7.6328E+01 | −2.5036E−04 | 1.6838E−05 | 0.0000E+00 | 0.0000E+00 |
| R9 | −4.2876E+01 | −4.0971E−05 | 2.2681E−06 | 0.0000E+00 | 0.0000E+00 |
| R10 | −1.8949E+01 | −2.6846E−06 | 1.1520E−07 | 0.0000E+00 | 0.0000E+00 |
| R11 | 1.4912E+01 | 1.0551E−06 | −2.0834E−08 | 0.0000E+00 | 0.0000E+00 |
| R12 | −1.2618E+01 | −1.8958E−06 | 5.0132E−08 | 0.0000E+00 | 0.0000E+00 |
| R13 | 2.8567E+00 | −4.9331E−07 | 9.0534E−09 | 0.0000E+00 | 0.0000E+00 |
| R14 | −2.6307E+01 | −1.5736E−07 | 2.3008E−09 | 0.0000E+00 | 0.0000E+00 |

Table 19 and Table 20 show design data of inflexion points and arrest points of each of the lenses of the camera optical lens 50 according to the fifth embodiment of the present disclosure.

TABLE 19

| | Number(s) of inflexion points | Inflexion point position 1 | Inflexion point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 1 | 0.825 | / |
| P5R1 | 2 | 0.955 | 1.405 |
| P5R2 | 2 | 0.965 | 1.655 |
| P6R1 | 1 | 2.505 | / |
| P6R2 | 2 | 0.905 | 2.145 |
| P7R1 | 0 | / | / |
| P7R2 | 1 | 0.905 | / |

TABLE 20

| | Number(s) of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 1 | 1.065 | / |
| P5R1 | 0 | / | / |
| P5R2 | 0 | / | / |
| P6R1 | 0 | / | / |
| P6R2 | 2 | 1.695 | 2.485 |
| P7R1 | 0 | / | / |
| P7R2 | 1 | 1.735 | / |

Figure 18:
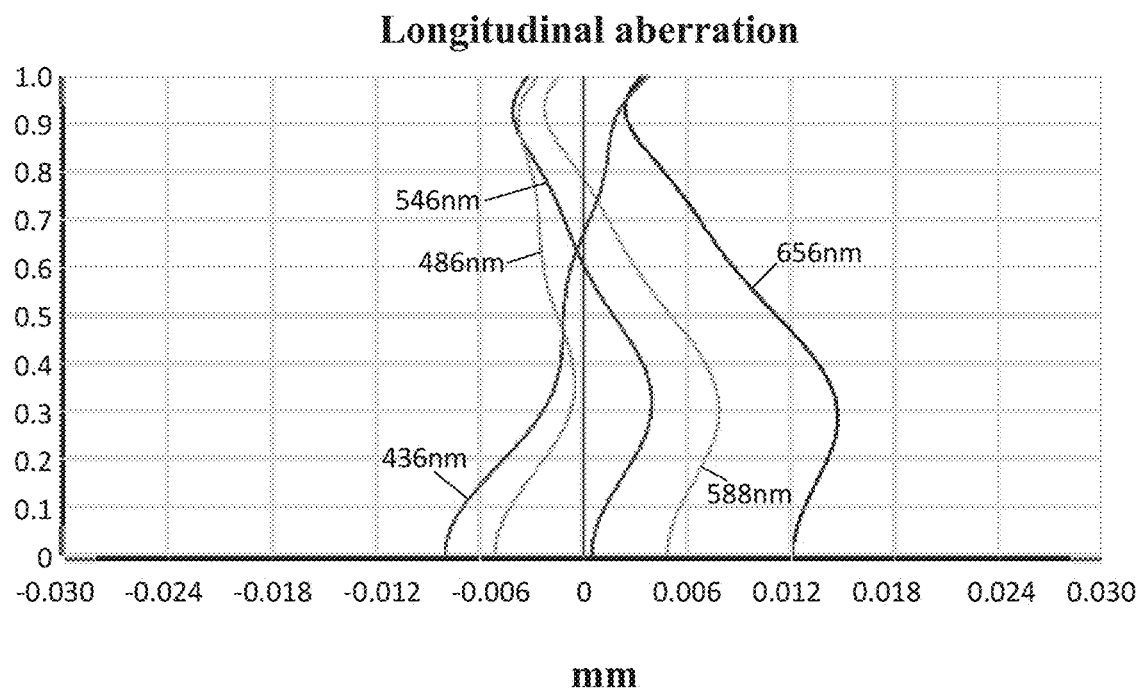
FIG. 18 is a schematic diagram of a longitudinal aberration of the camera optical lens shown in FIG. 17.
Figure 19:
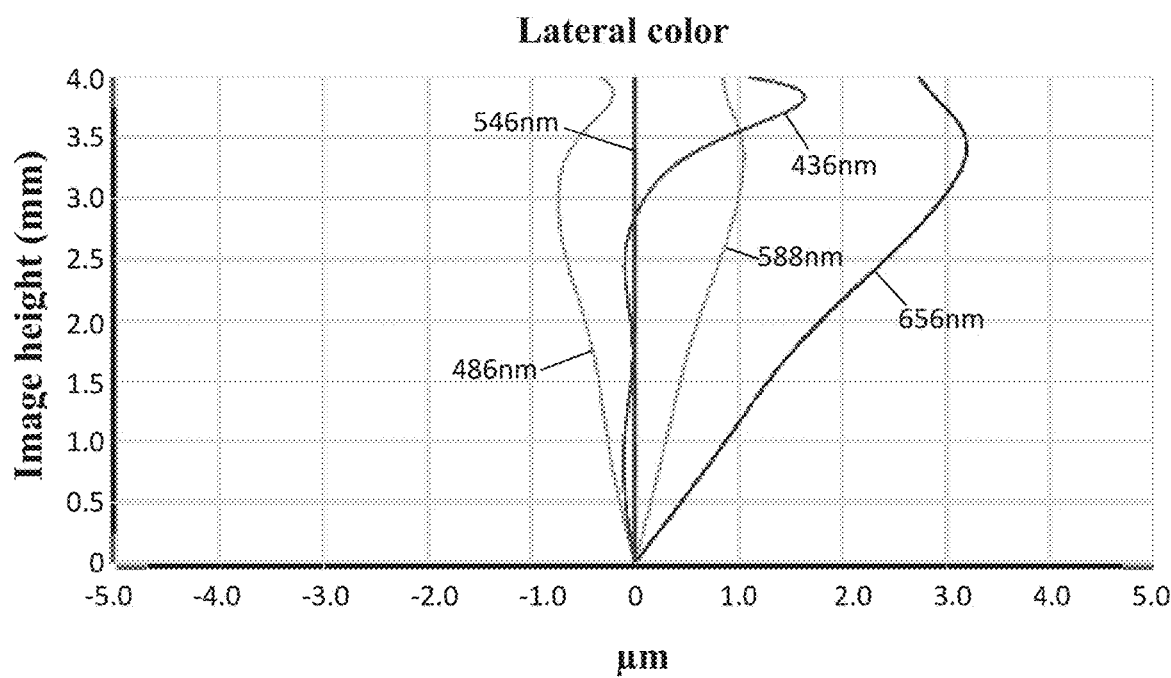
FIG. 19 is a schematic diagram of a lateral color of the camera optical lens shown in FIG. 17.
Figure 20:
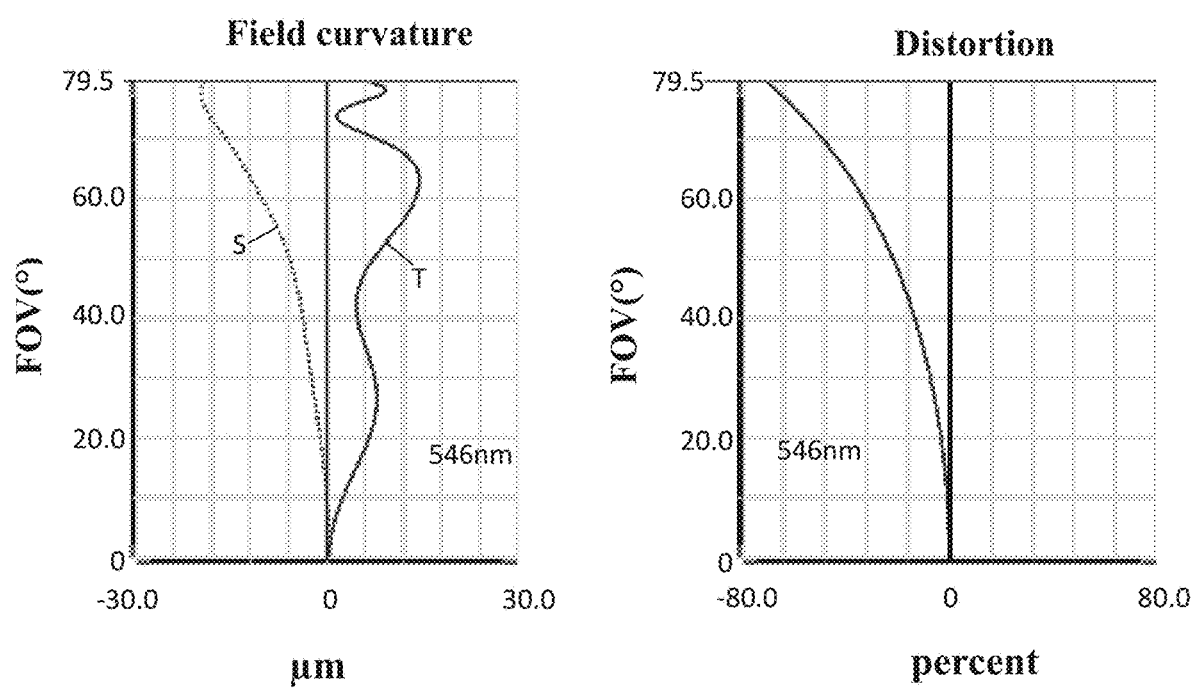
FIG. 20 is a schematic diagram of a field curvature and a distortion of the camera optical lens shown in FIG. 17.

FIG. 18 and FIG. 19 illustrate a longitudinal aberration and a lateral color of the lights having the wavelengths of 656 nm, 588 nm, 546 nm, 486 nm, and 436 nm after passing the camera optical lens 50 according to the fifth embodiment of the present disclosure, respectively. FIG. 20 illustrates a field curvature and a distortion of the light having the wavelength of 546 nm after passing the camera optical lens 50 according to the fifth embodiment of the present disclosure. A field curvature S in FIG. 20 is a field curvature in a sagittal direction, and T is a field curvature in a meridian direction.

The following table 21 lists numerical values corresponding to each conditional formula in the embodiment according to the above-mentioned conditional formulas. Obviously, the camera optical lens 50 of the embodiment satisfies the above-mentioned conditional formulas.

In the embodiment, an entrance pupil diameter is denoted as ENPD and the ENPD of the camera optical lens 50 is 0.946 mm. An image height is denoted as IH and the IH is 4.000 mm. A field of view is denoted as FOV and the FOV in the diagonal is 159.00 degree. The camera optical lens 50 meets the design requirements of the large aperture, wide-angle, and ultra-thinness, the on-axis and off-axis chromatic aberrations of which are fully corrected, and the camera optical lens 50 has excellent optical characteristics.

TABLE 21

| Parameters and conditions | Embodiment 1 | Embodiment 2 | Embodiment 3 | Embodiment 4 | Embodiment 5 |
|---|---|---|---|---|---|
| FOV | 158.00° | 157.00° | 157.00° | 157.00° | 159.00° |
| n2 | 2.18 | 2.03 | 1.88 | 1.72 | 1.75 |
| v3/v4 | 4.18 | 3.73 | 3.28 | 2.82 | 3.64 |
| R11/R12 | −4.95 | −3.75 | −2.55 | −1.25 | −2.15 |
| f | 2.462 | 2.462 | 2.462 | 2.462 | 2.498 |
| f1 | −5.504 | −4.633 | −4.231 | −4.267 | −4.347 |
| f2 | 9.935 | 7.509 | 7.457 | 8.024 | 6.123 |
| f3 | 3.257 | 3.242 | 3.151 | 3.056 | 3.329 |
| f4 | −8.985 | −7.622 | −6.423 | −6.043 | −4.303 |
| f5 | −30.170 | −14.700 | −29.613 | −17.160 | 34.903 |
| f6 | 7.606 | 5.971 | 6.377 | 6.799 | 7.504 |
| f7 | −5.868 | −5.463 | −5.063 | −5.986 | −6.564 |
| f12 | −6498.548 | 32.554 | 44.667 | 88.667 | 13.335 |
| FNO | 2.80 | 2.64 | 2.64 | 2.64 | 2.64 |
| TTL | 12.368 | 12.194 | 12.112 | 12.399 | 10.922 |
| IH | 4.000 | 4.000 | 4.000 | 4.000 | 4.000 |

It can be understood by one having ordinary skill in the art that the above-mentioned embodiments are specific embodiments of the present disclosure. In practical applications, various modifications can be made to these embodiments in forms and details without departing from the spirit and scope of the present disclosure.

What is claimed is:
1. A camera optical lens, comprising:
seven lenses, being sequentially from an object side to an image side, comprising:
a first lens having a negative refractive power;
a second lens having a positive refractive power;
a third lens having a positive refractive power;
a fourth lens having a negative refractive power;
a fifth lens having a refractive power;
a sixth lens having a positive refractive power; and
a seventh lens having a negative refractive power;
wherein, a field of view of the camera optical lens in a diagonal direction is denoted as FOV, a refractive index of the second lens is denoted as n2, an abbe number of the third lens is denoted as v3, an abbe number of the fourth lens is denoted as v4, a center curvature radius of an object side surface of the sixth lens is denoted as R11, a center curvature radius of an image side surface of the sixth lens is denoted as R12, an image height of the camera optical lens is denoted as IH, a total optical length of the camera optical lens is denoted as TTL; and the camera optical lens satisfies following relationships:

$155.00° \leq FOV$;

$1.70 \leq n2 \leq 220$;

$2.80 \leq v3/v4 \leq 4.20$;

$-5.00 \leq R11/R12 \leq -1.20$;

$TTL/IH \leq 3.25$.

2. The camera optical lens according to claim 1, wherein an on-axis thickness of the sixth lens is denoted as d11, an on-axis thickness of the seventh lens is denoted as d13, and the camera optical lens satisfies a following relationship:

$1.50 \leq d11/d13 \leq 4.00$.

3. The camera optical lens according to claim 1, wherein an object side surface of the first lens is convex in a paraxial region, an image side surface of the first lens is concave in a paraxial region;
   a focal length of the camera optical lens is denoted as f, a focal length of the first lens is denoted as f1, a center curvature radius of the object side surface of the first lens is denoted as R1, a center curvature radius of the image side surface of the first lens is denoted as R2, an on-axis thickness of the first lens is denoted as d1, and the camera optical lens satisfies following relationships:

$-4.47 \leq f1/f \leq -1.15$;

$0.72 \leq (R1+R2)/(R1-R2) \leq 2.54$;

$0.02 \leq d1/TTL \leq 0.10$.

4. The camera optical lens according to claim 3, wherein the camera optical lens satisfies following relationships:

$-2.79 \leq f1/f \leq -1.43$;

$1.15 \leq (R1+R2)/(R1-R2) \leq 2.03$;

$0.02 \leq d1/TTL \leq 0.08$.

5. The camera optical lens according to claim 1, wherein an object side surface of the second lens is concave in a paraxial region, an image side surface of the second lens is convex in a paraxial region;
   a focal length of the camera optical lens is denoted as f, a focal length of the second lens is denoted as f2, a center curvature radius of the object side surface of the second lens is denoted as R3, a center curvature radius of the image side surface of the second lens is denoted as R4, an on-axis thickness of the second lens is denoted as d3, and the camera optical lens satisfies following relationships:

$1.23 \leq f2/f \leq 6.05$;

$1.18 \leq (R3+R4)/(R3-R4) \leq 11.86$;

$0.07 \leq d3/TTL \leq 0.22$.

6. The camera optical lens according to claim 5, wherein the camera optical lens satisfies following relationships:

$1.96 \leq f2/f \leq 4.84$;

$1.89 \leq (R3+R4)/(R3-R4) \leq 9.49$;

$0.10 \leq d3/TTL \leq 0.18$.

7. The camera optical lens according to claim 1, wherein an object side surface of the third lens is convex in a paraxial region, an image side surface of the third lens is convex in a paraxial region;
   a focal length of the camera optical lens is denoted as f, a focal length of the third lens is denoted as f3, a center curvature radius of the object side surface of the third lens is denoted as R5, a center curvature radius of the image side surface of the third lens is denoted as R6, an on-axis thickness of the third lens is denoted as d5, and the camera optical lens satisfies following relationships:

$0.62 \leq f3/f \leq 2.00$;

$-0.39 \leq (R5+R6)/(R5-R6) \leq 0.12$;

$0.02 \leq d5/TTL \leq 0.20$.

8. The camera optical lens according to claim 7, wherein the camera optical lens satisfies following relationships:

$0.99 \leq f3/f \leq 1.60$;

$-0.25 \leq (R5+R6)/(R5-R6) \leq 0.10$;

$0.04 \leq d5/TTL \leq 0.16$.

9. The camera optical lens according to claim 1, wherein a focal length of the camera optical lens is denoted as f, a focal length of the fourth lens is denoted as f4, a center curvature radius of an object side surface of the fourth lens is denoted as R7, a center curvature radius of an image side surface of the fourth lens is denoted as R8, an on-axis thickness of the fourth lens is denoted as d7, and the camera optical lens satisfies following relationships:

$-7.30 \leq f4/f \leq -1.15$;

$-2.13 \leq (R7+R8)/(R7-R8) \leq 4.89$;

$0.01 \leq d7/TTL \leq 0.05$,

10. The camera optical lens according to claim 9, wherein the camera optical lens satisfies following relationships:

$-4.56 \leq f4/f \leq -1.44$;

$-1.33 \leq (R7+R8)/(R7-R8) \leq 3.91$;

$0.02 \leq d7/TTL \leq 0.04$.

11. The camera optical lens according to claim 1, wherein an object side surface of the fifth lens is concave in a paraxial region;
   a focal length of the camera optical lens is denoted as f, a focal length of the fifth lens is denoted as f5, a center curvature radius of the object side surface of the fifth lens is denoted as R9, a center curvature radius of an image side surface of the fifth lens is denoted as R10, an on-axis thickness of the fifth lens is denoted as d9, and the camera optical lens satisfies following relationships:

$-24.51 \leq f5/f \leq 20.96$;

$-7.05 \leq (R9+R10)/(R9-R10) \leq 14.14$;

$0.01 \leq d9/TTL \leq 0.05$.

12. The camera optical lens according to claim 11, wherein the camera optical lens satisfies following relationships:

$-15.32 \leq f5/f \leq 16.77$;

$-4.41 \leq (R9+R10)/(R9-R10) \leq 11.31$;

$0.02 \leq TTL \leq 0.04$.

13. The camera optical lens according to claim 1, wherein the object side surface of the sixth lens is convex in a paraxial region, the image side surface of the sixth lens is convex in a paraxial region;
a focal length of the camera optical lens is denoted as f, a focal length of the sixth lens is denoted as f6, an on-axis thickness of the sixth lens is denoted as d11, and the camera optical lens satisfies following relationships:

$1.21 \leq f6/f \leq 4.63$;

$0.03 \leq d11/TTL \leq 0.22$.

14. The camera optical lens according to claim 13, wherein the camera optical lens satisfies following relationships:

$1.94 \leq f6/f \leq 3.71$;

$0.06 \leq d11/TTL \leq 0.18$.

15. The camera optical lens according to claim 1, an image side surface of the seventh lens is concave in a paraxial region;
a focal length of the camera optical lens is denoted as f, a focal length of the seventh lens is denoted as f7, a center curvature radius of the object side surface of the seventh lens is denoted as R13, a center curvature radius of an image side surface of the seventh lens is denoted as R14, an on-axis thickness of the seventh lens is denoted as d13, and the camera optical lens satisfies following relationships:

$-5.26 \leq f7/f \leq -1.37$;

$-0.03 \leq (R13+R14)/(R13-R14) \leq 2.57$;

$0.02 \leq d13/TTL \leq 0.07$.

16. The camera optical lens according to claim 15, wherein the camera optical lens satisfies following relationships:

$-3.28 \leq f7/f \leq -1.71$;

$-0.02 \leq (R13+R14)/(R13-R14) \leq 2.06$;

$0.03 \leq d13/TTL \leq 0.06$.

17. The camera optical lens according to claim 1, wherein the first lens is made of a glass material, the second lens is made of a glass material, and the third lens is made of a glass material.

18. The camera optical lens according to claim 1, wherein an F number of the camera optical lens is denoted as FNO, and the camera optical lens satisfies a following relationship:

$FNO \leq 2.88$.

19. The camera optical lens according to claim 1, wherein a focal length of the camera optical lens is denoted as f, a combined focal length of the first lens and the second lens is denoted as f12, and satisfies a following relationship:

$-5279.08 \leq f12/f \leq 54.02$.

* * * * *